United States Patent
Lin

(10) Patent No.: US 11,200,140 B2
(45) Date of Patent: Dec. 14, 2021

(54) SOFTWARE PERFORMANCE TESTING

(71) Applicant: Dennis Lin, San Jose, CA (US)

(72) Inventor: Dennis Lin, San Jose, CA (US)

( * ) Notice: Subject to any disclaimer, the term of this patent is extended or adjusted under 35 U.S.C. 154(b) by 77 days.

(21) Appl. No.: 16/620,478

(22) PCT Filed: Jun. 11, 2018

(86) PCT No.: PCT/US2018/036955
§ 371 (c)(1),
(2) Date: Dec. 6, 2019

(87) PCT Pub. No.: WO2018/227206
PCT Pub. Date: Dec. 13, 2018

(65) Prior Publication Data
US 2020/0183806 A1 Jun. 11, 2020

Related U.S. Application Data

(60) Provisional application No. 62/517,814, filed on Jun. 9, 2017.

(51) Int. Cl.
G06F 11/00 (2006.01)
G06F 11/34 (2006.01)
G06F 11/36 (2006.01)

(52) U.S. Cl.
CPC ...... G06F 11/3438 (2013.01); G06F 11/3414 (2013.01); G06F 11/3664 (2013.01); G06F 11/3684 (2013.01); G06F 2201/865 (2013.01)

(58) Field of Classification Search
CPC ............ G06F 11/3414; G06F 11/3438; G06F 11/3664; G06F 11/3684; G06F 2201/865
See application file for complete search history.

(56) References Cited

U.S. PATENT DOCUMENTS

| 7,627,821 | B2 | 12/2009 | Klementiev | |
|---|---|---|---|---|
| 9,378,109 | B1* | 6/2016 | Phadke | G06F 11/3692 |
| 9,424,167 | B2 | 8/2016 | Lee | |
| 2014/0282400 | A1 | 9/2014 | Moorthi | |
| 2015/0029107 | A1* | 1/2015 | Kuznetsov | G06F 11/3041 345/173 |
| 2015/0082280 | A1* | 3/2015 | Betak | G06F 11/3692 717/124 |

(Continued)

FOREIGN PATENT DOCUMENTS

WO  WO-2016206113 A1 * 12/2016 ........... G06F 3/0481

OTHER PUBLICATIONS

International Application No. PCT/US2018/036955, Search Report and Written Opinion dated Aug. 31, 2018.

(Continued)

*Primary Examiner* — Joshua P Lottich
(74) *Attorney, Agent, or Firm* — Ahmann Kloke, LLP

(57) ABSTRACT

Systems and methods for performance testing software using computer vision. Systems can include a performance testing computer vision system and a computer vision-based performance testbed system. Methods can include generating a computer vision-based testing package and performance testing software in one or more testing environments on at least one virtualized testbed machine according to testing constraints using the computer vision-based testing package.

20 Claims, 10 Drawing Sheets

(56) References Cited

U.S. PATENT DOCUMENTS

| | | | |
|---|---|---|---|
| 2015/0339213 A1* | 11/2015 | Lee | G06F 3/0484 |
| | | | 717/125 |
| 2016/0054981 A1* | 2/2016 | Cao | G06F 8/33 |
| | | | 717/109 |
| 2017/0046254 A1 | 2/2017 | Buege | |
| 2018/0189170 A1* | 7/2018 | Dwarakanath | G06K 9/344 |
| 2018/0307591 A1* | 10/2018 | Lin | G06K 9/78 |

OTHER PUBLICATIONS

Alegroth, Emil et al., "Conceptualization and Evaluation of Component-based Testing Unified with Visual GUI Testing: An Empirical Study," 2015 IEEE 8th International Conference on Software Testing, Verification and Validation (ICST), Apr. 2015.

Alegroth, Emil et al., "JAutomate: A Tool for System- and Acceptance-test Automation," 2013 IEEE 6th International Conference on Software Testing, Verification and Validation (ICST), Mar. 2013.

Alegroth, Emil et al., "Maintenance of Automated Test Suites in Industry: An Empirical Study on Visual GUI Testing," Information and Software Technology, vol. 73, Feb. 2016.

Alegroth, Emil et al., "Visual GUI Testing in Practice: Challenges, Problems and Limitations," Journal of Empirical Software Engineering, vol. 20, No. 3, pp. 694-744, Jun. 2015.

Chang, Tsung-Hsiang et al., "GUI Testing Using Computer Vision," Proceedings of the 28th International Conference on Human Factors in Computing Systems (CHI 2010), Apr. 2010.

* cited by examiner

SOFTWARE PERFORMANCE TESTING

CROSS-REFERENCE TO RELATED APPLICATIONS

This application is a national phase application pursuant to 35 U.S.C. § 371 of International Application No. PCT/US2018/036955 filed Jun. 11, 2018, which claims priority to U.S. Provisional Patent Application Ser. No. 62/517,814 filed Jun. 9, 2017, the disclosures of which are hereby incorporated by reference herein.

DETAILED DESCRIPTION

Figure 1:
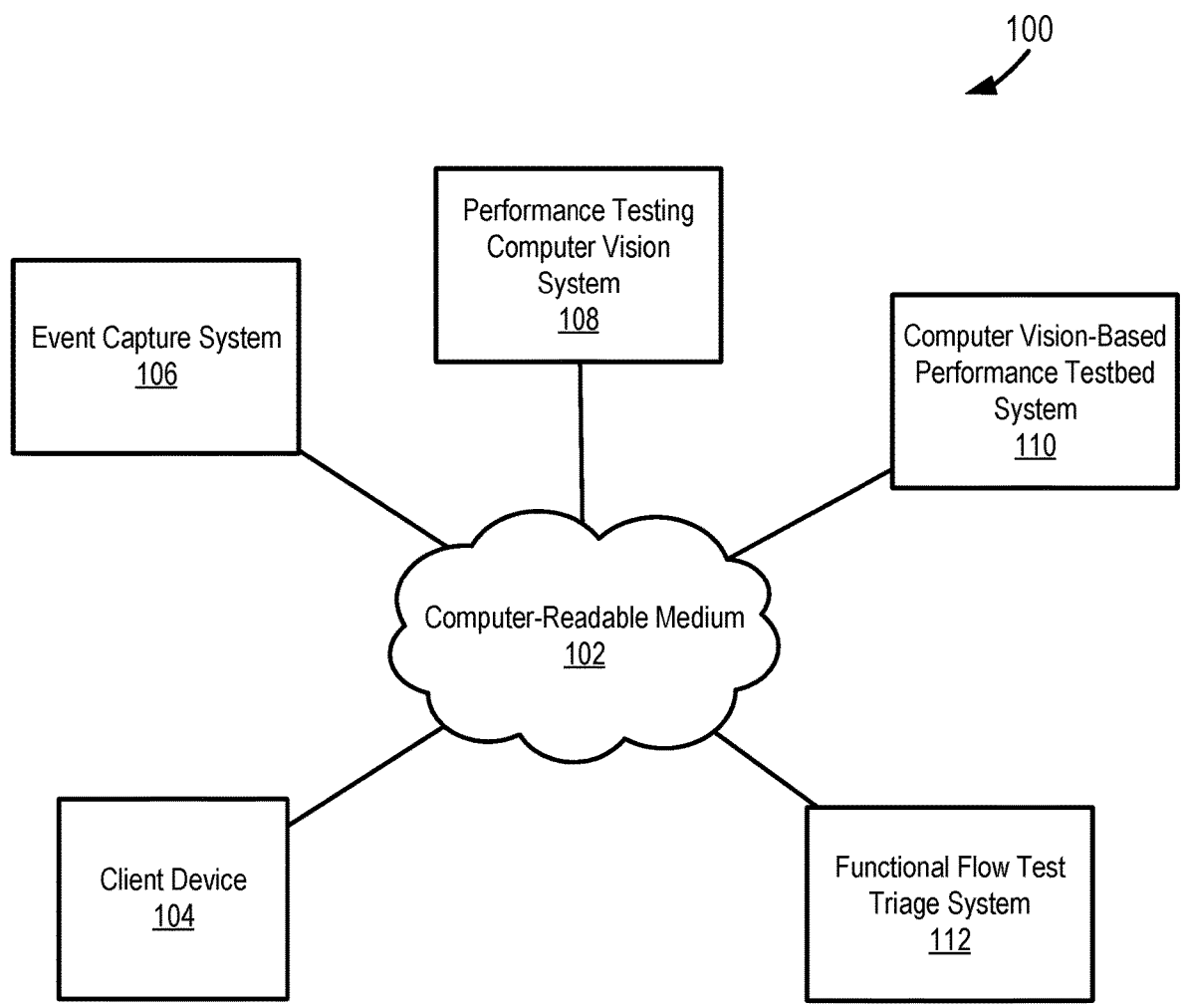
FIG. 1 depicts a diagram of an example of a system for conducting performance testing of software using computer vision.

FIG. 1 depicts a diagram 100 of an example of a system for conducting performance testing of software using computer vision. The system of the example of FIG. 1 includes a computer-readable medium 102, a client device 104, an event capture system 106, a performance testing computer vision system 108, computer vision-based performance testbed system 110, and a functional flow test triage system 112. In the example system in FIG. 1, the client device 104, the event capture system 106, the performance testing computer vision system 108, the computer vision-based performance testbed system 110, and the functional flow test triage system 112 are coupled to each other through the computer-readable medium 102.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

Assuming a computer-readable medium includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (hereinafter referred to as "HTTP") for hypertext markup language (hereinafter referred to as "HTML") documents that make up the World Wide Web (hereinafter referred to as "the web"). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. As used in this paper, edge devices include applicable devices at an edge of one or a combination of a LAN, a WLAN, a consumer network, and an enterprise network. For example, an edge device can be a networking device, at an edge of a LAN, providing wireless access to network services through a WLAN. In another example, an edge device can be an IoT device accessing network services through a LAN. In yet another example, an edge device can be an IoT device transmitting data through at least a portion of a wired connection, e.g. a Universal Serial Bus (hereinafter referred to as "USB") connection. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. That is, the engine includes hardware. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The example system shown in FIG. 1 functions to conduct or otherwise facilitate performance testing of software. Performance testing of software, as used in this paper, includes testing software by executing the software according to certain input, e.g. testing input, in one or a plurality of testing environments and examining the one or a plurality of testing environments. One or a plurality of testing environments in which software is executed as part of conducting performance testing can be examined either before or after the software is executed in the testing environments. Testing input can specify ways in which to execute software as part of conducting performance testing of the software in one or a plurality of testing environments. For example, if testing input indicates a user activates a specific icon in interacting with an application, then conducting performance testing of the software can include executing the software in one or a plurality of testing environments, as if the user activated the specific icon.

In a specific implementation, performance testing includes comparing an actual output of executing software according to testing input in one or a plurality of testing environments to an expected output of executing the software according to the testing input. For example, performance testing can include comparing an actual output of executing an application when a user activates an icon to an expected output of executing the application when a user activates the icon in a testing environment. An expected output of executing software according to testing input can be indicated by an applicable source describing desired or otherwise proper output of software in execution. For example, an expected output of executing software can be indicated by specifications for the software or expected output indications received from a user, e.g. a software developer or tester.

In a specific implementation, performance testing includes comparing a plurality of testing environments as software is executed in the plurality of testing. For example, a first environment in which software is executed according to testing input can be compared to a second environment in which the software is executed according to the testing input for conducting performance testing of the software. In comparing a plurality of testing environments as software is executed in the environments, an actual output of the software executing in each environment can be compared as part of conducting performance testing of the software. For example, an actual output achieved in executing software in a first testing environment can be compared to an actual output achieved in executing the software in a second testing environment for conducting performance testing of the software. Further in the example, if a function in executing the software fails to occur in the first testing environment when executing the software in the environment, then performance testing of the software can indicate the function failed when software was executed in the first testing environment.

In a specific implementation, testing input includes performance testing constrains for use in conducting performance testing of software in one or a plurality of testing environments. Performance testing constraints include applicable conditions for conducting performance testing of software in at least one testing environment. Performance testing constraints can include applicable conditions and characteristics for defining a testing environment. For example, performance testing constraints can include an operation system of a testing environment, a type of device a testing environment is supposed to simulate, a concurrency or throughput goal of a testing environment, a simulated server response time of a testing environment, a simulated render response time of a testing environment, and performance specifications and requirement of a testing environment. Additionally, performance testing constrains can include applicable conditions and characteristics for controlling operation of a test environment. For example, performance testing constrains can include operation parameters for stress testing software in one or a plurality of testing environments, operation parameters for soak testing or endurance testing software in one or a plurality of testing environments, operation parameters for spike testing software in one or a plurality of testing environments, operation parameters for configuration testing software in one or a plurality of testing environments, operation parameters for isolation testing software in one or a plurality of testing environments.

The example system shown in FIG. 1 functions to conduct performance testing of software using computer vision. In using computer vision to perform testing on software, the example system shown in FIG. 1 can create a computer vision testing package used in conducting performance testing of software on one or a plurality of testbed machines supporting one or a plurality of testing environments. A computer vision-based testing package can include applicable data created, at least in part, using computer vision. Specifically, a computer vision-based testing package can include graphical elements in a graphical representation of output of executing software and properties of the identified elements. For example, a computer vision-based testing package can include an identification of an icon in a graphical representation of output of executing software and logic to follow in execution of the software if the icon is activated. Additionally, a computer vision-based testing package can include executable code or portions of executable code of software. For example, a computer vision-based testing package can include a portion of code to execute when a user activates an icon in interacting with a graphical representation of output of executing software. In another example, a computer vision-based testing package is a script package and includes code in a scripting language, hereinafter referred to as script, capable of being executed based on user interactions with a representation, potentially graphical, of output of executing software. In using computer vision to conduct performance testing of software, costs and maintenance requirements associated with testing software are reduced.

In a specific implementation, a computer vision-based testing package includes images or videos used to generate the computer vision-based testing package. For example, if a video shows a user activating or attempting to activate an icon, then a computer vision-based testing package can include the video of the user activating or attempting to activate the icon. Further in the example, the computer vision-based testing package can include script associated with activating the icon in executing the software for purposes of conducting performance testing of the software.

In a specific implementation, a computer vision-based testing package used by the example system shown in FIG. 1 to conduct performance testing of software includes testing input for use in conducting performance testing of software. As discussed previously, testing input can include applicable input for use in determining how to execute software as part of conducting performance testing of the software. For example, testing input can indicate to execute code associated with activating an icon in a graphical representation of output of executing software. Testing input can be generated based on events associated with user interaction with a graphical representation of output of executing software. For example, if a user activates an icon in a graphical representation of output of executing software, then testing input can specify executing script associated with activating the icon. Additionally, testing input can be generated based on applicable input received from a user. For example, if a user, in an audio recording, states that they want to opening a specific file in executing software, then testing input can include the audio recording and specify to execute script associated with opening the specific file in the execution of the software.

In the example system shown in FIG. 1, the client device 104 is intended to represent a device that functions to be utilized by a user in sending and receiving data for purposes of conducting performance testing of software. Specifically, the client device 104 can be used to send code of software to be tested. Additionally, the client device 104 can be used to send a conceptualization or abstraction of software to be tested. For example, the client device 104 can be utilized by a user to provide a mockup of a website. The client device 104 can be utilized by a user to receive performance testing results. Performance testing results can include applicable data related to conducting performance testing software using computer vision. For example, performance testing results can include one or a combination of a notification software underwent or is undergoing performance testing, code executed as part of conducting performance testing of software, code generated or modified as part of conducting performance testing of software, problems encountered and errors found through conducting performance testing software, testbed machine characteristics of a testbed machine used to conduct performance testing of software, testing input used in conducting performance testing of software, testing constraints used in conducting performance testing of software, representations of an output of software executing as part of conducting performance testing, indications of failures of software to meet testing constraints in conducted performance tests, and images or videos of a graphical representation of output of software executing as part of conducting performance testing. In a specific example, performance testing results can include code used to interact with a website generated by conducting performance testing the website.

In a specific implementation, the client device 104 functions to provide testing input in conducting performance testing of software. For example, the client device 104 can be used to provide testing input indicating to execute software in testing environments as if a specific element in a representation of an output of the executing software has been activated. Additionally, the client device 104 can provide testing input including testing constraints for use in conducting performance testing of software.

In a specific implementation, the client device 104 includes mechanisms through which a user can perceive output of executing software as part of conducting performance testing of the software. For example, the client device 104 can include a speaker through which a user can hear sounds included as part of output of executing software under performance testing. Additionally, the client device 104 can include a graphical display. A graphical display of the client device 104 can be utilized by a user to interact with a graphical representation of output of executing software, potentially as part of conducting performance testing of software. Further, a graphical display of the client device 104 can be utilized by a user to interact with a conceptualization or abstraction of software. For example, a graphical display of the client device 104 can be utilized by a user to interact with a mock-up of a website. A user can view performance testing results using a graphical display of the client device 104. Additionally, a user can view through a graphical display of the client device 104 performance testing results in real time as performance testing is conducted on software. For example, through a graphical display of the client device 104, a user can view images or video in real time of a graphical representation of an output of executing software as performance testing is conducted. Further in the example, through a graphical display of the client device 104, a user can view a popup box code executed as the software is executed.

In a specific implementation, the client device 104 functions to provide a test harness for use in conducting performance testing of software. A test harness can include applicable data used in conducting performance testing of software. Specifically, a test harness can include either or both code or portions of code used in executing software and functions in executing the software associated with the code or the portions of code. For example, a test harness provided by the client device 104 can include a call to functions used in executing specific portions of software. Additionally, a test harness provided by the client device can include 104 testing input. For example, testing input included as part of a test harness can specify to open a specific file using software under test and a specific icon in a graphical representation of executing software to activate.

In the example system shown in FIG. 1, the event capture system 106 is intended to represent a system that functions to capture user interactions with a physically perceivably representation of output of executing software for purposes of controlling performance testing of software. The event capture system 106 can capture user interactions with a graphical representation of an output of executing software for purposes of conducting performance testing of the software. For example, the event capture system 106 can capture a user activating or attempting to activate an icon in a graphical representation of an output of executing software, generated as performance testing is conducted on the software. Additionally, the event capture system 106 can capture user interactions with a graphical representation of an abstraction of software for purposes of conducting performance testing. For example, the event capture system 106 can capture user interactions with a mockup of a webpage for purposes of performance testing the webpage. In capturing user interactions with a graphical display for purposes of conducting performance testing of software, the event capture system can generate videos or images showing a user's interactions with a graphical display. For example, the event capture system 106 can capture a video of a user activating an icon in a graphical representation of an output of software executing. Additionally, in capturing user interactions with a physically perceivable representation of output of executing software, the event capture system can capture sounds a user makes in interacting with the physically perceivable representation.

In a specific implementation, the event capture system 106 functions to be implemented at an applicable device to capture user interaction with a physically perceivable representation of an output of executing software for purposes of conducting performance testing. The event capture system 106 can be implemented as a camera separate from a user device for purposes of capturing user interaction with a graphical display of the user device. For example, the event capture system 106 can be implemented as a camera positioned over a should of a user and configured to capture the user's interactions with a graphical display of a graphical representation of output of software executing. Further the event capture system 106 can be implemented at a client device. For example, the event capture system 106 can be implemented at a client device and configured to capture a video or screen shots of a graphical representation of user interactions with an abstraction of software presented to a user through the client device. Additionally, the event capture system 106 can be implemented as a microphone for capturing sounds a user makes in interacting with a physically perceivable representation of an output of executing software.

In the example system shown in FIG. 1, the performance testing computer vision system 108 is intended to represent a system that functions to generate data used in testing software using computer vision. In generating data used in testing software, the performance testing computer vision system 108 can generate a computer vision-based testing package using computer vision. For example, the performance testing computer vision system 108 can use computer vision to recognize elements in a representation of output of executing software to be tested. In another example, the performance testing computer vision system 108 can use computer vision to recognize elements in a graphical representation of a mockup of a website to be tested. The performance testing computer vision system 108 can use an applicable computer vision method for generating a computer vision-based testing package. For example, the performance testing computer vision system 108 can utilize machine vision to recognize graphical elements in software being performance tested. In another example, the performance testing computer vision system 108 can apply machine learning to elements identified manually by a user to automatically identify objects or elements through computer vision. In yet another example, the performance testing computer vision system 108 can use graphical user interface scripting to generate a computer vision-based testing package.

In a specific implementation, the performance testing computer vision system 108 functions to generate a computer vision-based testing package used in testing software based on input received from a user. User input can include testing input. For example, user input utilized by the performance testing computer vision system 108 can include testing constraints for controlling performance testing of software. In another example, if user input indicates functions associated with elements in a graphical representation of output of executing software, then the performance testing computer vision system 108 can generate a computer vision-based testing package associating the functions with the element. Additionally, the performance testing computer vision system 108 can utilize audio input received from a user to generate a computer vision-based testing package. For example, if a user provides audio input of a specific question the user asks software in interacting with the software, then the performance testing computer vision system 108 can generate audio input indicating to execute the software as if a user is asking the software the specific question as part of controlling performance testing of the software.

In a specific implementation, the performance testing computer vision system 108 functions to generate a computer vision-based testing package according to user interactions with a representation of an output of executing software. For example, the performance testing computer vision system 108 can generate a computer vision-based testing package according to user interactions with a physically perceivable representation of an output of executing software. The performance testing computer vision system 108 can generate a computer vision-based testing package according to user interactions captured by an applicable system for capturing user interactions with a physically perceivable representation of an output of executing software, such as the event capture systems described in this paper. The performance testing computer vision system 108 can generate a computer vision-based testing package according to user interactions with a graphical representation of output of executing software. For example, if a user activates an icon in a graphical representation of output of executing software under test, then the performance testing computer vision system 108 can generate a computer vision-based testing package with testing input indicating to execute code associated with activating the icon. Additionally, the performance testing computer vision system 108 can generate a computer vision-based testing package according to user interactions with a graphical representation of an abstraction of software under test. For example, the performance testing computer vision system 108 can generate a computer vision-based testing package for use in performance testing a website based on user interactions with a graphical representation of a mockup of the website.

In a specific implementation, the performance testing computer vision system 108 functions to recognize user interactions with a physically perceivable representation of an output of executing software in order to generate a computer vision-based testing package. The performance testing computer vision system 108 can recognize user interactions with a graphical representation of either or both an output of executing software or an output of an abstraction of software under test for purposes of generating computer vision-based testing package. For example, the performance testing computer vision system 108 can determine testing input from user interactions with a graphical representation of an output of executing software recognized through computer vision. Further in the example, the performance testing computer vision system 108 can subsequently generate a computer vision-based testing package based on the determined testing input.

In a specific implementation, the performance testing computer vision system 108 functions to create testing input for use in controlling performance testing of software. The performance testing computer vision system 108 can create testing input for inclusion in a computer vision-based testing package and used in conducting performance testing of software. The performance testing computer vision system 108 can create testing input based on one or a combination of input received from a user, user interactions with a physically perceivable representation of an abstraction of software, and user interactions with a physically perceivable representation of an output of executing software. For example, if input received from a user indicates testing constraints for conducting performance testing of software, then the performance testing computer vision system 108 can generate a computer vision-based testing package including testing constraints.

In a specific implementation, the performance testing computer vision system 108 functions to create a computer vision-based testing package using received code for software. In using received code to create a computer vision-based testing package, the performance testing computer vision system 108 can associate the code with functions performed when the code is executed. For example, if code is executed when a user activates an element in a graphical representation of output of executing software, then the performance testing computer vision system 108 can associate the code with the function of activation of the element. Additionally, the performance testing computer vision system 108 can use modified code to create a computer vision-based testing package. For example, if a user modifies code and provides the modified code as a result of performance testing software, then the performance testing computer vision system 108 can include the modified code in a computer vision-based testing package for use in further controlling performance testing of the software.

In a specific implementation, the performance testing computer vision system 108 functions to create a computer vision-based testing package using a received test harness. Specifically, the performance testing computer vision system 108 can create a computer vision-based testing package based upon a test framework included as part of a received test harness. For example, the performance testing computer vision system 108 can determine testing input, e.g. testing constraints, for testing software from a test harness and subsequently generate a computer vision-based testing package including the determined testing input. Testing input can include specific functions to call with parameters in controlling performance testing of software.

In a specific implementation, the performance testing computer vision system 108 functions to create a computer vision-based testing package including a script package. The performance testing computer vision system 108 can use an applicable computer vision method, such as graphical user interface scripting, to generate a computer vision-based testing package including a script package. In creating a computer vision-based testing package including a script package, the performance testing computer vision system 108 can generate script for performing functions associated with user interactions with a physically perceivable representation of an output of executing software or an abstraction of software. Additionally, the performance testing computer vision system 108 can associate script for performing functions with elements in a graphical representation of output of executing software. The performance testing computer vision system 108 can generate script by simulating user interactions with a graphical representation of output of executing software and use computer vision to identify the interactions and elements in the graphical representation which can subsequently be associated with the script. Further, the performance testing computer vision system 108 can generate script and associate the script with elements based on user input. For example, the performance testing computer vision system 108 can generate script based on user input indicating functions associated with activating an element in a graphical representation of an output of executing software.

In the example system shown in FIG. 1, the computer vision-based performance testbed system 110 is intended to represent a system that functions to manage performance testing of software on one or a plurality of testbed machines. The computer vision-based performance testbed system 110 can manage performance testing of software using a computer vision-based testing package. Additionally, the computer vision-based performance testbed system 110 can receive a computer vision-based testing package from an applicable system for generating data for use in performance testing software, such as the performance testing computer vision systems described in this paper. In managing performance testing of software, the computer vision-based performance testbed system 110 can execute code in a computer vision-based testing package according to testing input. For example, the computer vision-based performance testbed system 110 can execute script included in a script package according to testing input indicated in the script package to performance test software. Further, in managing performance testing of software, the computer vision-based performance testbed system 110 can control either or both a testing environment and execution of software in the testing environment according to testing constraints included as part of testing input. For example, the computer vision-based performance testbed system 110 can cause a testing environment to perform stress testing on software as part of performance testing the software.

In a specific implementation, the computer vision-based performance testbed system 110 functions to virtualize a testbed machine, corresponding to one or a plurality of testing environments, for use in executing code on the testbed machine for purposes of conducting performance testing of software. The computer vision-based performance testbed system 110 can virtualize a testbed machine remote from a client device utilized by a user for purposes of conducting performance testing of software. For example, the computer vision-based performance testbed system 110 can virtualize one or a plurality of testbed machines corresponding to one or a plurality of testing environments on purchased server space. In virtualizing a testbed machine, the computer vision-based performance testbed system 110 can configure the testbed machine according to specific testbed machine characteristics. Testbed machine characteristics include applicable characteristics for configuring a testbed machine to operate according to in testing software. For example, the computer vision-based performance testbed system 110 can configure a testbed machine to operate as an Android® device using the Android® operating system at a specific output display size. Additionally, the computer vision-based performance testbed system 110 can configure a testbed machine based on testing input, e.g. testing constraints, indicating testbed machine characteristics. For example, if a computer vision-based testing package indicates a user wants to conduct performance testing of software on devices operating different versions of an operating system, then the computer vision-based performance testbed system 110 can configure one or a plurality of testbed machines to operate using the different versions of the operating system.

In a specific implementation, the computer vision-based performance testbed system 110 functions to conduct performance testing analysis of software being performance tested to generate performance testing results data. Performance testing results data includes applicable data generated by conducting performance testing analysis. The computer vision-based performance testbed system 110 can conduct performance testing analysis by examining one or a plurality of testing environments in which software is performance tested. In examining one or a plurality of testing environments that software is performance tested in, the computer vision-based performance testbed system 110 can detect changes to the one or plurality of testing environments as software is performance tested in the environments as part of conducting performance testing analysis. For example, if software executes differently a specific number of times when it is executed rapidly in a testing environment, then the computer vision-based performance testbed system 110 can identify the discrepancies each time the software is executed in the environment as part of conducting performance testing analysis. Further, in examining a plurality of testing environments in which software is performance tested, the computer vision-based performance testbed system 110 can compare the plurality of environments. For example, the computer vision-based performance testbed system 110 can identify discrepancies in execution of software in different testing environments as part of conducting performance testing analysis.

In a specific implementation, the computer vision-based performance testbed system 110 functions to conduct performance testing analysis by examining output of executing software in one or a plurality of testing environments in response to testing input. The computer vision-based performance testbed system 110 can examine output of executing software in one or a plurality of testing environments as part of examining the one or a plurality of testing environments in conducing performance testing analysis. In conducting performance testing analysis in performance testing of software, the computer vision-based performance testbed system 110 can compare outputs of executing software in one or a plurality of environments multiple times according to the same testing input. For example, if a dialog box appears when software is executed on a testbed machine a first time and fails to appear when the software is executed on the testbed machine a second time, then the computer vision-based performance testbed system 110 can highlight the problem of the dialog box failing to appear, as part of conducting performance testing analysis in the performance testing of the software.

In a specific implementation, the computer vision-based performance testbed system 110 functions to conduct performance testing analysis based on a frequency at which elements change in a graphical representation of output of software executing as part of performance testing the software. Specifically, as part of conducting performance testing analysis, the computer vision-based performance testbed system 110 can highlight elements that change frequently or fail to change frequently in a graphical representation of output of software executing in one or a plurality of testing environments multiple times as part of performance testing the software. Additionally, as part of conducting performance testing analysis based on a frequency at which elements change, the computer vision-based performance testbed system 110 can highlight elements that change frequently or infrequently in a graphical representation of output of software executing multiple times according to the same testing input as part of performance testing the software.

In a specific implementation, the computer vision-based performance testbed system 110 functions to conduct performance testing analysis based on a degree of change of an element in a graphical representation of output of software executing in one or a plurality of testing environments as part of performance testing the software. Specifically, as part of conducting performance testing analysis, the computer vision-based performance testbed system 110 can highlight elements that change a specific amount in a graphical representation of output of software executing in one or more testing environments multiple times. For example, if an element of a graphical representation of an output of executing software changes in size greater than specific threshold amounts when the software is executed multiple times in a testing environment, then the computer vision-based performance testbed system 110 can highlight the element. Additionally, as part of conducting performance testing analysis based on a degree of change of elements, the computer vision-based performance testbed system 110 can highlight elements in a graphical representation of output of software executing multiple times in one or a plurality of testing environments according to the same testing input based on the degree in which the elements change.

In a specific implementation, the computer vision-based performance testbed system 110 functions to conduct performance testing analysis by comparing an actual output of executing software to an expected output of executing the software in one or a plurality of testing environments according to testing input. In comparing an actual output to an expected output of executing software, the computer vision-based performance testbed system 110 can compare a graphical representation of the actual output of the executing software to a graphical representation of the expected output of the executing software. For example, the computer vision-based performance testbed system 110 can compare an element in a graphical representation of an actual output of executing software in a plurality of testing environments with an element in a graphical representation of an expected output of executing the software. Further in the example, the computer vision-based performance testbed system 110 can compare the element in the actual output and the expected output to determine either or both a frequency at which the element changes or a degree to which the element changes as the software is executed multiple times in one or a plurality of testing environments, as part of conducting performance testing analysis of the software.

In a specific implementation, the computer vision-based performance testbed system 110 functions to use computer vision to conduct performance testing analysis of software. In using computer vision to conduct performance testing analysis of software, the computer vision-based performance testbed system 110 can use computer vision to detect changes in graphical representations of output of software executing as it is subjected to performance testing. Specifically, the computer vision-based performance testbed system 110 can use computer vision to detect either or both a frequency and a degree to which elements change in graphical representations of an output of executing software as part of performance testing the software. For example, the computer vision-based performance testbed system 110 can use computer vision to determine a frequency at which an element in a graphical representation of an output of executing software changes when the software is executed multiple times according to the same testing input as part of performance testing the software. In another example, the computer vision-based performance testbed system 110 can use computer vision to determine a degree to which an element changes in a graphical representation of an output of executing software when the software is executed multiple times according to the same testing input as part of performance testing the software.

In a specific implementation, the computer vision-based performance testbed system 110 functions to generate performance testing results. The computer vision-based performance testbed system 110 can generate performance testing results by conducting performance testing analysis. For example, the computer vision-based performance testbed system 110 can generate performance testing results including elements highlighted based on either or both a frequency at which the elements change and a degree to which the elements change as software is executed multiple times in one or a plurality of testing environments. Additionally, the computer vision-based performance testbed system 110 can generate performance testing results based on an output of executing software as part of performance testing the software. For example, the computer vision-based performance testbed system 110 can generate performance testing results used to reproduce either or both a graphical representation of an output of executing software and a graphical representation of code executed in executing the software. In another example, the computer vision-based performance testbed system 110 can generate performance testing results including code generated created through executing software as part of performance testing the software. Performance testing results can be utilized by a user in changing software under performance testing. For example, if performance testing results indicate software is incompatible with a version of an operating system, then a user can modify the software to make it compatible with the version of the operating system.

In a specific implementation, the computer vision-based performance testbed system 110 functions to provide performance testing results to a user, through an applicable device utilized by the user, such as the client devices described in this paper. In providing performance testing results, the computer vision-based performance testbed system 110 can provide performance testing results data generated through conducting performance testing analysis on software to a user. For example, the computer vision-based performance testbed system 110 can provide performance testing results data indicating elements in a graphical representation of an output of executing software highlighted based on either or both a degree and a frequency at which the elements change in the representation, as determined through performance testing of the software. Additionally, in providing performance testing results, the computer vision-based performance testbed system 110 can provide a stream data used to produce a graphical representation of an output of software executing as part of performance testing the software. For example, the computer vision-based performance testbed system 110 can provide a stream of data used to reproduce a graphical representation of an output of software executing as part of performance testing the software using a computer vision-based testing package.

In a specific implementation, the computer vision-based performance testbed system 110 functions to either or both modify and generate code of software as part of performance testing the software. The computer vision-based performance testbed system 110 can modify or generate code of software based on results of performance testing software. For example, if in conducting performance testing of software a function of the software fails, then the computer vision-based performance testbed system 110 can modify code of the software in order to correct the function of the software. Further in the example, the computer vision-based performance testbed system 110 can modify the code of the software in order to correct the functions according to instructions received from a user in response to the user being notified of the functions failure. In modifying and generating code of software as part of conducting performance testing of the software, the computer vision-based performance testbed system 110 can modify a computer vision-based testing package used in conducting performance testing of the software. For example, the computer vision-based performance testbed system 110 can modify a script package used in conducting performance testing of software by modifying code used in executing the software and included as part of the script package. The computer vision-based performance testbed system 110 can provide modified and generated code to a user, whereinafter the user can re-submit the modified and generated code for further performance testing of the software. For example, the computer vision-based performance testbed system 110 can provide a modified computer vision-based testing package to a user, and the user can subsequently submit the modified computer vision-based testing package for use in additional performance testing of the software.

In a specific implementation, the computer vision-based performance testbed system 110 can modify code as part of performance testing software based on received modification input. Modification input can be received from an applicable source, such as a client device or an applicable system for performing automated recovery of a flow of executing software in performance testing the software, such as the functional flow testing triage systems described in this paper. For example, modification input can include user input indicating modifications to make to code of software in response to problems identified through performance testing of the software. In another example, modification input can include recovery input indicating steps to take, including code modifications to make, in recovering a flow of executing software in performance testing the software.

In the example system shown in FIG. 1, the functional flow testing triage system 112 is intended to represent a system that functions to automatically perform recovery of a flow of executing software in performance testing the software. In automatically performing recovery, the functional flow testing triage system 112 can generate and provide recovery input for recovering a flow of executing software in performance testing the software. Recovery input identifies applicable steps and instructions for recovering a flow of executing software in performance testing the software. For example, recovery input can identify code to modify in order to make a function of activating an icon work while performance testing software. In another example, recovery input can identify modification to make to a script in a script package used in performance testing software.

In a specific implementation, the functional flow testing triage system 112 functions to use recovery strategies in automatically performing recovery of a flow of executing software in performance testing the software. Recovery strategies include applicable rules and conditions for automatically recovering a flow of executing software, e.g. for purposes of conducting performance testing of the software. For example, recovery strategies can specify that if a specific function fails to execute in performance testing software, then either or both executing another function before executing the specific function and modifying code to execute the another function before executing the specific function can be performed as part of recovery strategies. Recovery strategies can be maintained based on input received from an applicable source. For example, recovery strategies can be maintained based on input received from a software developer of software subjected to performance testing. Additionally, recovery strategies can be maintained based on machine learning or an applicable automated process. For example, recovery strategies can be maintained based on previous performance testing of software. Further in the example, recovery strategies can be maintained based on previous performance testing of software of the same type as software currently being tested.

In a specific implementation, the functional flow testing triage system 112 functions to automatically perform recovery of a flow of executing software in conducting performance testing based on output of executing the software in performance testing the software. The functional flow testing triage system 112 can compare an actual output of executing software with an expected output of executing the software to perform recovery of a flow of execution of the software in performance testing the software. For example, the functional flow testing triage system 112 can determine ways in which software is not operating as expected, e.g. from performance testing results generated by comparing actual and expected output, and subsequently generate recovery input for use in recovering a flow of execution of the software in performance testing the software. Additionally, the functional flow testing triage system 112 can use application of computer vision to output of executing software for purposes of performance testing the software to perform recovery of a flow of execution of the software. For example, the functional flow testing triage system 112 can use an identification that an element is not functioning properly, e.g. as identified by performance testing results and recognized through computer vision, to perform recovery of a flow of execution of the software for purposes of performance testing the software.

In an example of operation of the example system shown in FIG. 1, the client device 104 presents to a user a graphical representation of output of executing software for purposes of performance testing the software. In the example of operation of the example system shown in FIG. 1, the event capture system 106 captures images of the user interacting with the graphical representation of the output of the executing software presented to the user through the client device 104. Further, in the example of operation of the example system shown in FIG. 1, the performance testing computer vision system 108 applies computer vision to the images to recognize user interactions with the graphical representation of the output of the executing software. In the example of operation of the example system shown in FIG. 1, the performance testing computer vision system 108 generates a computer vision-based testing package for purposes of performance testing the software based on the user interactions with the graphical representation of the output of the executing software identified using computer vision. Additionally, in the example of operation of the example system shown in FIG. 1, the computer vision-based performance testbed system 110 manages performance testing of the software in at least one testing environment created on at least one virtualized testbed machine using the computer vision-based testing package. In the example of operation of the example system shown in FIG. 1, the functional flow testing triage system 112 performs automatic recovery of a flow of the executing software as it is executed on the at least one virtualized testbed machine as part of performance testing the software.

Figure 2:
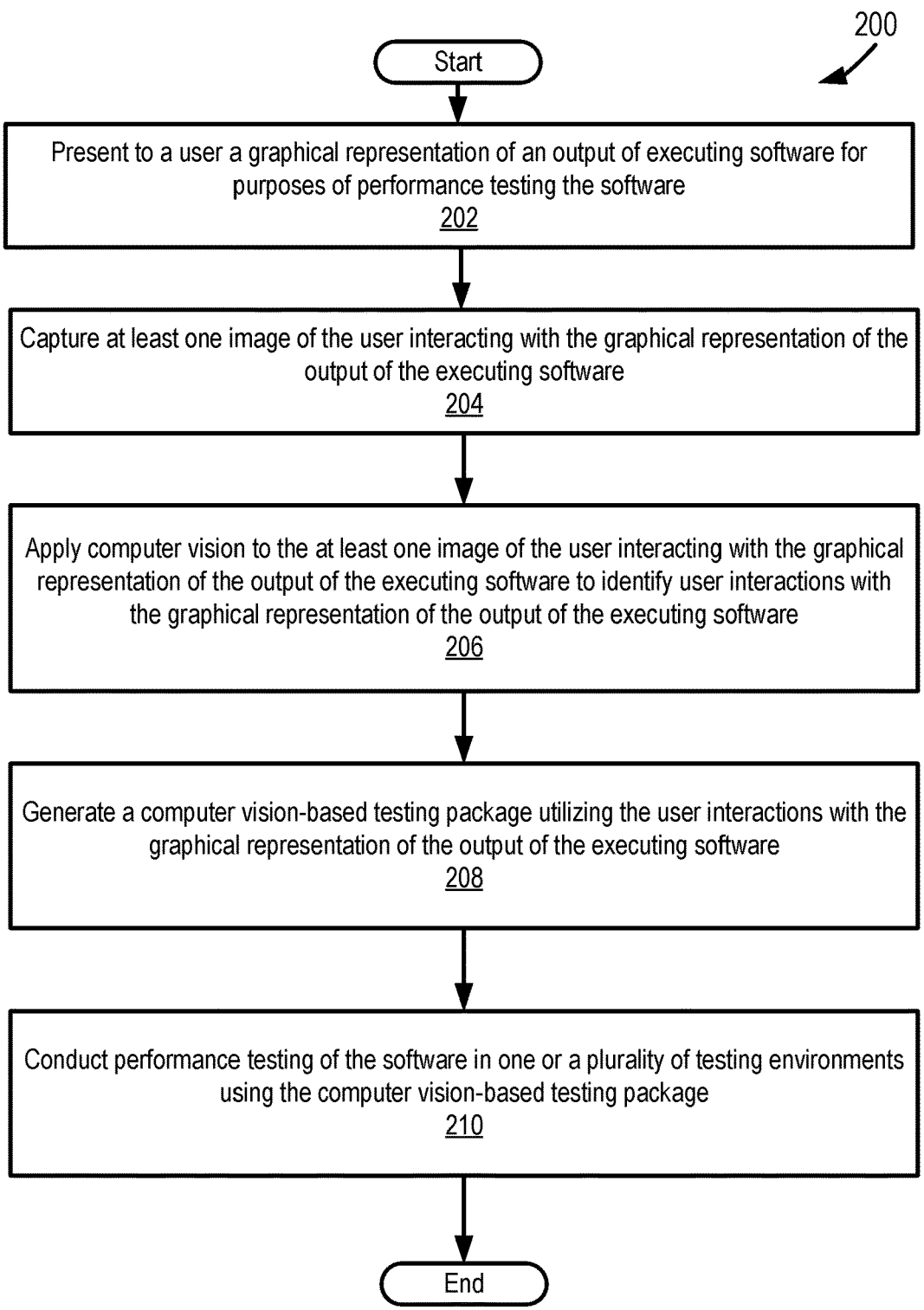
FIG. 2 depicts a flowchart of an example of a method for conducting performance testing of software using computer vision.

FIG. 2 depicts a flowchart 200 of an example of a method for conducting performance testing of software using computer vision. The flowchart 200 begins at module 202, where a graphical representation of an output of executing software is presented to a user for purposes of performance testing the software. An applicable device, such as the client devices described in this paper, can be used to present to a user a graphical representation of an output of executing software for purposes of performance testing the software. In presenting to a user a graphical representation of an output of executing software, an abstraction of software can be presented to a user. For example, a mockup of a website can be presented to a user that a user can interact with for purposes of performance testing the software.

The flowchart 200 continues to module 204, where at least one image of the user interacting with the graphical representation of the output of the executing software is captured. An applicable system for capturing user interaction with a graphical representation of the output of executing software, such as the event capture systems described in this paper, can capture at least one image of the user interacting with the graphical representation of the output of the executing software. For example, a camera positioned to have a view of the graphical representation of the output of executing software can capture at least one image of the user interacting with the graphical representation of the output of the executing software. In another example, a screen capture application, integrated as part of a client device, can capture at least one image of the user interacting with the graphical representation of the output of the executing software through a display integrated as part of the client device.

The flowchart 200 continues to module 206, where computer vision is applied to the at least one image of the user interacting with the graphical representation of the output of the executing software to identify user interactions with the graphical representation of the output of the executing software. An applicable system for applying computer vision to generate data used in performance testing software, such as the performance testing computer vision systems described in this paper, can apply computer vision to the at least one image of the user interacting with the graphical representation of the output of the executing software to identify the user interactions with the graphical representation of the output of the executing software. For example, computer vision can be applied to determine elements a user activates in interacting with the graphical representation of the output of the executing software. Further in the example, computer vision can be applied to determine changes to the graphical representation of the output of the executing software in response to the user interacting with the graphical representation of the output the executing software. Additionally, in applying computer vision to the at least one image to identify user interactions with the graphical representation of the output of the executing software, graphical elements in the graphical representation of the output of the executing software can be identified. For example, an icon in a graphical representation of the output of the executing software can be identified from the at least one image using computer vision.

In a specific implementation, computer vision is applied to the at least one image of the user interacting with the graphical representation of the output of the executing software to identify user interactions with the graphical representation at a client device or remote from a client device displaying the graphical representation. For example, computer vision can be applied at a remote server to the at least one image of the user interacting with the graphical representation in order to identify user interactions with the graphical representation of the output of the executing software. In another example, computer vision can be applied to the at least one image by at least a portion of an applicable system implemented at least in part at a client device to identify user interactions with the graphical representation of the output of the executing software locally at the client device.

The flowchart 200 continues to module 208, where a computer vision-based testing package is generated utilizing the user interactions with the graphical representation of the output of the executing software. An applicable system for applying computer vision to generate data used in performance testing software, such as the performance testing computer vision systems described in this paper, can generate a computer vision-based testing package utilizing the user interactions with the graphical representation of the output of the executing software. In utilizing the interactions with the graphical representation of the output of the executing software to generate data used in performance testing software, a script package including script can be generated based on user interactions with the graphical representation of the output of the executing software. For example, if a user activates a graphical icon and a window appears as a result of the user activating the icon, then a script package can be created including script to cause the window to appear when the icon is activated. Additionally, a computer vision-based testing package can be created based on input received from the user. For example, a computer vision-based testing package can be created using code for the software included as part of input received from the user. In another example, a computer vision-based testing package can be created using a test harness included as part of input received from the user. In yet another example, a computer vision-based testing package can be created using testing input determined from input provided by the user. In yet another example, a computer vision-based testing package can be generated using testing constraints received as testing input from a user.

The flowchart 200 continues to module 210, where the software is performance tested in one or a plurality of testing environments using the computer vision-based testing package. An applicable system for managing performance testing of software in a testing environment, such as the computer vision-based performance testbed systems described in this paper, can conduct performance testing of the software in one or a plurality of testing environments using the computer vision-based testing package. In performance testing the software, one or a plurality of testing environments can be set up according to testing constraints included as part of testing input and software can be executed in the one or a plurality of testing environments using the computer vision-based testing package according to the testing constraints and the testing input. For example, the software can be executed the same way across a plurality of simulated iPhones® represented by the one or a plurality of testing environments. Further in the example, the one or a plurality of testing environments can be created on one or a plurality of virtualized testbed machines. In conducting performance testing of the software in one or a plurality of testing environments, performance testing analysis can be performed by examining the software executing in the one or a plurality of testing environments using the computer vision-based testing package.

Figure 3:
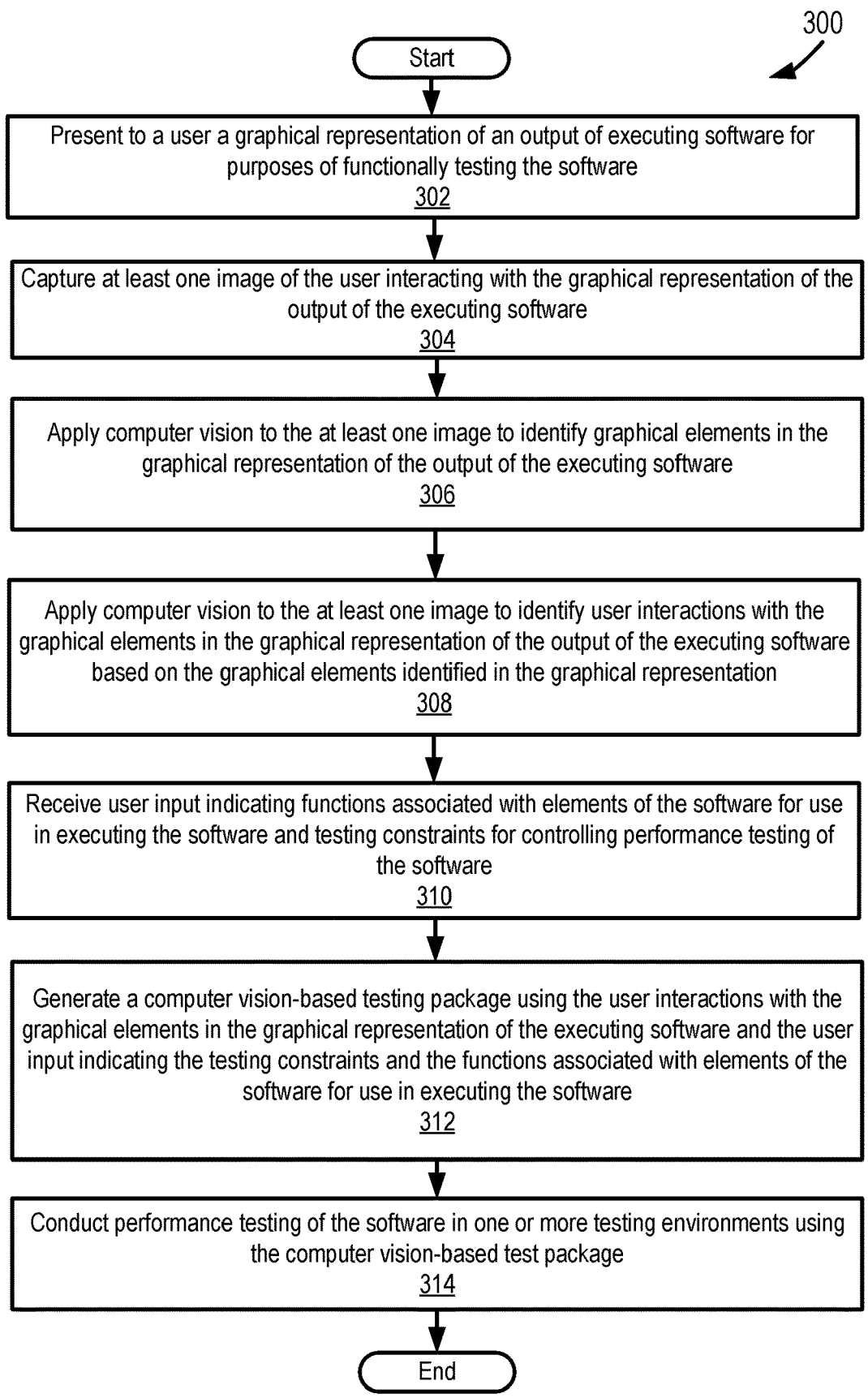
FIG. 3 depicts a flowchart of another example of a method for conducting performance testing of software using computer vision.

FIG. 3 depicts a flowchart 300 of another example of a method for conducting performance testing of software using computer vision. The flowchart 300 begins at module 302, where a graphical representation of an output of executing software is presented to a user for purposes of performance testing the software. An applicable device, such as the client devices described in this paper, can be used to present to a user a graphical representation of an output of executing software for purposes of performance testing the software. In presenting to a user a graphical representation of an output of executing software, an abstraction of software can be presented to a user. For example, a mockup of a website can be presented to a user that a user can interact with for purposes of performance testing the software.

The flowchart 300 continues to module 304, where at least one image of the user interacting with the graphical representation of the output of the executing software is captured. An applicable system for capturing user interaction with a graphical representation of the output of executing software, such as the event capture systems described in this paper, can capture at least one image of the user interacting with the graphical representation of the output of the executing software. For example, a camera positioned to have a view of the graphical representation of the output of executing software can capture at least one image of the user interacting with the graphical representation of the output of the executing software. In another example, a screen capture application, integrated as part of a client device, can capture at least one image of the user interacting with the graphical representation of the output of the executing software through a display integrated as part of the client device.

The flowchart 300 continues to module 306, where computer vision is applied to the at least one image to identify graphical elements in the graphical representation of the output of the executing software. An applicable system for applying computer vision to generate data used in performance testing software, such as the performance testing computer vision systems described in this paper, can apply computer vision to the at least one image of the user interacting with the graphical representation of the output of the executing software to identify graphical elements in the graphical representation of the output of the executing software. For example, computer vision can be applied to identify graphical icons capable of being activated in the graphical representation of the output of the executing software. Additionally, computer vision can be applied to the graphical representation to identify functions associated with graphical elements. For example, computer vision can be applied to identify a webpage that appears when an icon in another webpage is activated in the graphical representation of the output of the executing software.

The flowchart 300 continues to module 308, where computer vision is applied to the at least one image to identify user interactions with the graphical elements in the graphical representation of the output of the executing software based on the graphical elements identified in the graphical representation. An applicable system for applying computer vision to generate data used in performance testing software, such as the performance testing computer vision systems described in this paper, can apply computer vision to the at least one image of the user interacting with the graphical representation of the output of the executing software to identify the user interactions with the graphical representation of the output of the executing software. For example, computer vision can be applied to determine elements a user activates in interacting with the graphical representation of the output of the executing software. Further in the example, computer vision can be applied to determine changes to the graphical representation of the output of the executing software in response to the user interacting with the graphical representation of the output the executing software.

The flowchart 300 continues to module 310, where user input indicating functions associated with elements of the software including the graphical elements for use in executing the software is received. An applicable system for applying computer vision to generate data used in performance testing software, such as the performance testing computer vision systems described in this paper, can receive user input indicating functions associated with elements for use in executing the software. For example, a user can input how to execute the software if a user activates one of the graphical elements in the graphical representation of the output of the executing software. In another example, a user can input how to execute the software if a user speaks a specific phrase or performs a specific action in interacting with the software. Additionally, at module 310, testing constraints included as testing input is received from the user. Testing constraints can include characteristics of one or a plurality of testing environments to set up for purposes of conducting performance testing on the software. Additionally, testing constraints can include how to control or otherwise test the software as part of performance testing the software.

The flowchart 300 continues to module 312, where a computer vision-based testing package is generated using the user interactions with the graphical elements and the user input indicating the testing constraints and the functions associated with elements of the software for use in executing the software. An applicable system for applying computer vision to generate data used in performance testing software, such as the performance testing computer vision systems described in this paper, can generate a computer vision-based testing package using the user interactions with the graphical elements and the user input indicating the functions associated with elements of the software for use in executing the software. For example, a computer vision-based testing package can be created including testing input to use in performance testing the software, as determined from the user interactions with the graphical elements in the graphical representation of the output of the executing software. In another example, a computer vision-based testing package can be created including functions of the software to execute according to the testing input based on the input received from the user regarding functions associated with the elements of the software for use in executing the software.

In a specific implementation, a script package is created in generating a computer vision-based testing package using the user interactions with the graphical elements and the user input indicating the functions associated with the elements of the software for use in executing the software. A script package can be created to include testing input and testing constraints for use in conducting performance testing of the software. For example, a script package can include testing input generated based on the user interactions with the graphical elements in the graphical representation of the output of the executing software. Additionally, script for use in executing the software for purposes of performance testing the software can be included in a script package. For example, script in a script package can be created based on the received user input indicating functions associated with elements of the software for use in executing the software.

The flowchart 300 continues to module 314, where the software is performance tested in one or more testing environments using the computer vision-based testing package. An applicable system for managing performance testing of software in one or more testing environments, such as the computer vision-based performance testbed systems described in this paper, can control performance testing of the software in one or more testing environments using the computer vision-based testing package. In performance testing the software using the computer vision-based testing package, script or code included as part of the package can be executed in one or more testing environments according to testing input included as part of the package. For example, the software can be executed in one or more testing environments according to testing constraints included as part of the testing input.

Figure 4:
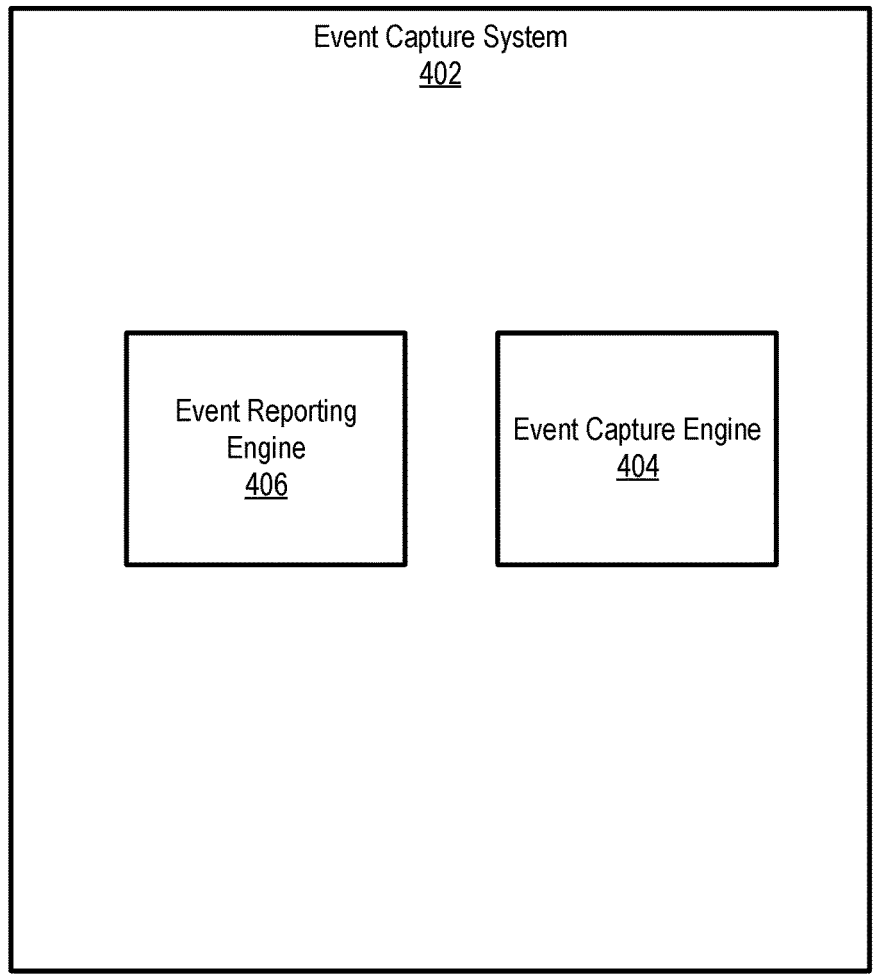
FIG. 4 depicts a diagram of an example of an event capture system.

FIG. 4 depicts a diagram 400 of an example of an event capture system 402. The event capture system 402 is intended to represent an applicable system that functions to capture user interactions for purposes of controlling performance testing of software, such as the event capture systems described in this paper. In capturing events for purposes of performance testing software, the event capture system 402 can capture images of a user interacting with a graphical display. Specifically, the event capture system 402 can capture images of a user interacting with a graphical representation of either or both an output of executing software and an abstraction of software. For example, the event capture system 402 can capture images of a user interacting with a graphical representation of a mockup of a website. The event capture system 402 can either or both be implemented at a client device with a graphical display or separate from a client device with a graphical display. For example, the event capture system 402 can be implemented, at least in part, as a camera with a view of a user interacting with a graphical display of a client device. In another example, the event capture system 402 can be implemented as part of a screen capture application at a client device and configured to capture user interactions with a graphical display at the client device.

The event capture system 402 shown in FIG. 4 includes an event capture engine 404 and an event reporting engine 406. In the example event capture system 402 shown in FIG. 4, the event capture engine 404 is intended to represent an engine that functions to capture user interactions for purposes of performance testing software. The event capture engine 404 can capture user interactions with a graphical display for purposes of performance testing software. For example, the event capture engine 404 can capture a user activating a graphical element in a graphical representation of executing software. In another example, the event capture engine 404 can capture a user activating a link in a mockup of a website presented to the user through a graphical display. Additionally, the event capture engine 404 can capture movements made by a user or words spoken by the user. For example, the event capture engine 404 can be integrated as part of microphone and configured to capture an auditory command a user utters when viewing a graphical display, for purposes of performance testing software.

In a specific implementation, the event capture engine 404 functions to generate event data representing captured events. In generating event data, the event capture engine 404 can generate images included as part of event data. For example, the event capture engine 404 can generate images showing user interactions with a graphical representation of output of executing software, e.g. graphical elements in the graphical representation activated by the user. In another example, the event capture engine 404 can generate images showing gestures made by a user, for example in viewing a graphical representation of output of executing software. Additionally, in generating event data, the event capture engine 404 can generate audio data included as part of event data. For example, the event capture engine 404 can generate event data including an audio recording of auditory commands a user utters when interacting with a graphical representation of output of executing software.

In the example event capture system 402 shown in FIG. 4, the event reporting engine 406 is intended to represent an engine that functions to provide data representing user interactions for use in performance testing software. The event reporting engine 406 can provide data representing user interactions to an applicable system for generating data use in controlling performance testing of software using computer vision, such as the performance testing computer vision systems described in this paper. The event capture system 402 can provide data representing user interactions to a remote system. For example, the event capture system 402 can provide event data including images of a user interacting with a graphical representation of an output of executing software for purposes of performance testing the software to a remote system from the event capture system 402. Further in the example, at the remote system, the images of a user interacting with a graphical representation of the output of the executing software can be used to generate a computer vision-based testing package for use in performance testing the software.

In an example of operation of the example event capture system 402 shown in FIG. 4, the event capture engine 404 generates event data indicating user interactions with a graphical representation of an output of executing software. In the example of operation of the example system shown in FIG. 4, the event reporting engine 406 provides the event data to an applicable system for use in generating data used in performance testing the software.

Figure 5:
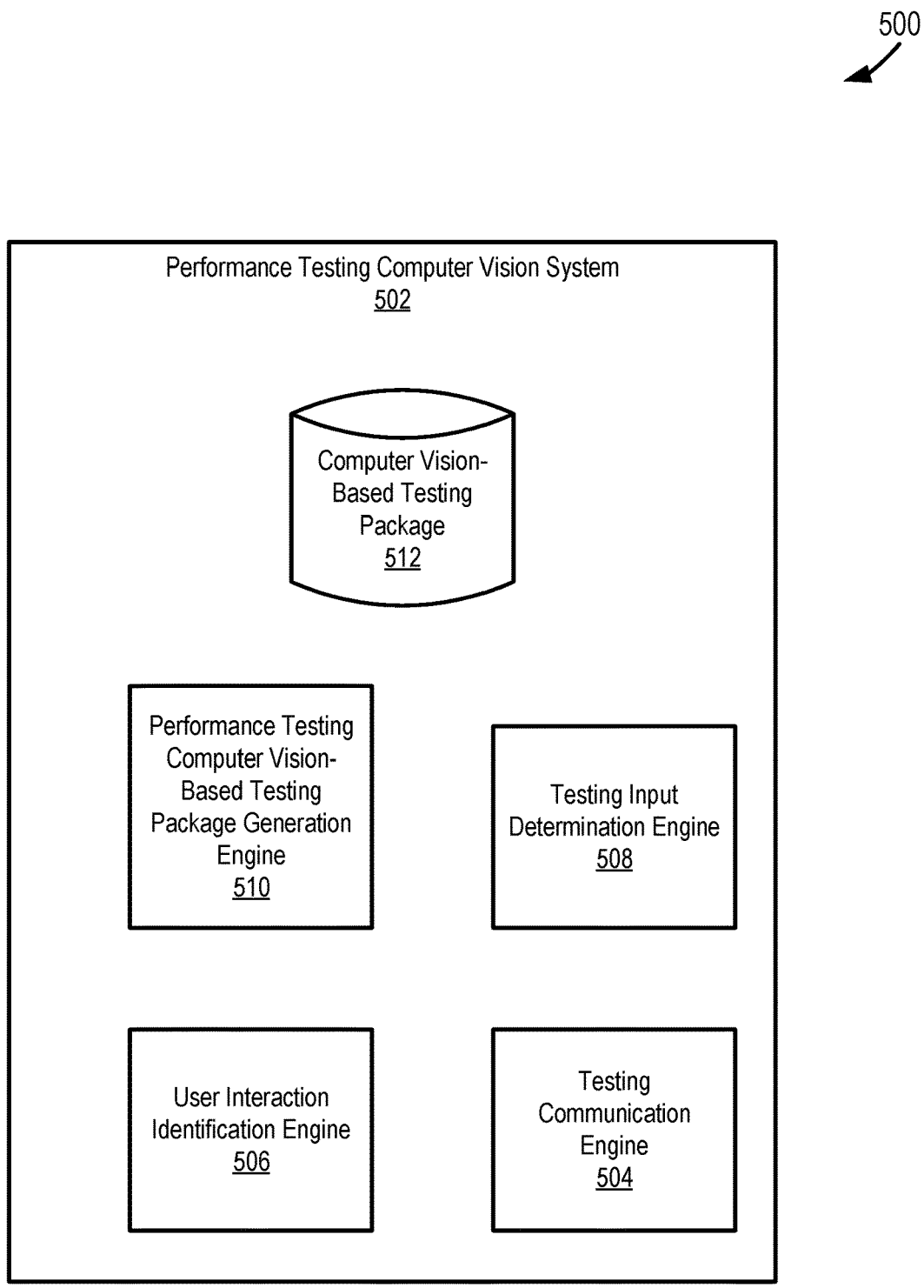
FIG. 5 depicts a diagram of an example of a performance testing computer vision system.

FIG. 5 depicts a diagram 500 of an example of a performance testing computer vision system 502. The performance testing computer vision system 502 is intended to represent an applicable system that functions to generate data used in performance testing software, such as the performance testing computer vision systems described in this paper. In generating data used in performance testing software, the performance testing computer vision system 502 can generate a computer vision-based testing package for use in controlling performance testing of software. For example, the performance testing computer vision system 502 can generate a computer vision-based testing package including testing input, e.g. testing constraints, for controlling performance testing of software and code to execute in performance testing the software. Further, in generating data used in performance testing software, the performance testing computer vision system 502 can generate a computer vision-based testing package that is a script package. For example, the performance testing computer vision system 502 can generate a script package including testing input to control performance testing of software and script to execute in performance testing the software. Further in the example, the performance testing computer vision system 502 can generate the script based on either or both event data indicating user interactions with a graphical representation of output of executing software and input, e.g. testing constraints, received from the user.

In a specific implementation, the performance testing computer vision system 502 functions to use computer vision to generate data used for performance testing software. In using computer vision to generate data used for performance testing software, the performance testing computer vision system 502 can apply computer vision to received event data. For example, the performance testing computer vision system 502 can apply computer vision to event data to identify graphical elements in a graphical representation of an output of executing software which can subsequently be used to generate a computer vision-based testing package for the software. In another example, the performance testing computer vision system 502 can apply computer vision to event data to identify user interactions with a graphical representation of an output of executing software which can subsequently be used to generate a computer vision-based testing package for the software.

In a specific implementation, the performance testing computer vision system 502 functions to use input received from a user to generate data used for performance testing software. The performance testing computer vision system 502 can utilize user input including code to software to generate a computer vision-based testing package for use in performance testing the software. For example, the performance testing computer vision system 502 can include code to execute in performance testing software according to testing inputs in a computer vision-based testing package for the software. Additionally, the performance testing computer vision system 502 can utilize user input indicating functions associated with code or elements of software to generate a computer vision-based testing package for use in performance testing the software. For example, if user input indicates a function in execution of software associated with activation of a graphical element, then the performance testing computer vision system 502 can generate script to include in a script package that when executed performs the function indicated by the user input. Further, the performance testing computer vision system 502 can utilize user input indicating testing constraints to generate a computer vision-based testing package for performance testing software. For example, the performance testing computer vision system 502 can generate a computer vision-based testing package including testing constraints specifying to replicate a webpage being tested having a high traffic volume accessing the webpage.

The example performance testing computer vision system 502 shown in FIG. 5 includes a testing communication engine 504, a user interaction identification engine 506, a testing input determination engine 508, a performance testing computer vision-based testing package generation engine and a computer vision-based testing package datastore 512. The testing communication engine 504 is intended to represent an engine that functions to send and receive data used in performance testing software using computer vision. The testing communication engine 504 can receive event data from an applicable system for generating event data for use in controlling performance testing of software, such as the event capture systems described in this paper. For example, the testing communication engine 504 can receive images, as part of event data, of a user interacting with a graphical representation of output of executing software. Additionally, the testing communication engine 504 can receive user input regarding performance testing software. For example, the testing communication engine 504 can receive portions of code of software, for use in executing the software as part of performance testing the software. In another example, the testing communication engine 504 can receive user input indicating functions in executing software associated with graphical elements and code. In yet another example, the testing communication engine 504 can receive from a user a test harness for use in creating data to use in performance testing software. In yet another example, the testing communication engine 504 can receive testing constraints for use in configuring one or more testing environments in which software can be performance tested.

In a specific implementation, the testing communication engine 504 functions to provide data for use in performance testing software. For example, the testing communication engine 504 can provide a computer vision-based testing package associated with software for use in performance testing the software. In another example, the testing communication engine 504 can provide a script package created for performance testing software. The testing communication engine 504 can provide data used in performance testing software to an applicable system for managing performance testing of software in one or more testing environments, such as the computer vision-based performance testbed systems described in this paper.

In a specific implementation, the testing communication engine 504 functions to receive a modified computer vision-based testing package. The testing communication engine 504 can receive a modified computer vision-based testing package from either or both an applicable system for managing performance testing of software in one or more testing environments, such as the computer vision-based performance testbed systems described in this paper, or a user. For example, an applicable system for managing performance testing of software can provide a modified computer vision-based testing package modified during the performance testing of software. In another example, a user can resubmit a modified computer vision-based testing package modified during performance testing of software in response to performance testing results. The testing communication engine 504 can provide a modified computer vision-based testing package to an applicable system for managing performance testing of software in one or more testing environments, such as the computer vision-based performance testbed systems described in this paper.

In the example performance testing computer vision system 502 shown in FIG. 5, the user interaction identification engine 506 is intended to represent an engine that functions to determine user interactions for use in controlling performance testing of software. The user interaction identification engine 506 can determine user interactions with a graphical representation of output of executing software. For example, the user interaction identification engine 506 can determine graphical elements a user activates in interacting with a graphical representation of output of executing software. In another example, the user interaction identification engine 506 can determine user interactions with a mockup of a website. The user interaction identification engine 506 can determine user interactions based on received event data. For example, the user interaction identification engine 506 can determine a user activated a specific graphical element in interacting with a graphical representation of output of executing software through received event data. In another example, the user interaction identification engine 506 can identify user interactions including auditory commands a user utters based on received event data.

In a specific implementation, the user interaction identification engine 506 functions to utilize computer vision in determining user interactions. For example, the user interaction identification engine 506 can identify graphical elements in a display of a graphical representation of output of executing software using computer vision. Further in the example, the user interaction identification engine 506 can identify user interactions including interactions with the graphical elements in the display of the graphical representation of the output of the executing software using computer vision. The user interaction identification engine 506 can apply computer vision to received event data to determine user interactions. For example, the user interaction identification engine 506 can apply computer vision to images of a user interacting with a graphical representation of an output of executing software to determine graphical elements the user activates in interacting with the graphical representation.

The testing input determination engine 508 in the example performance testing computer vision system 502 shown in FIG. 5 is intended to represent an engine that functions to determine testing input for use in controlling performance testing of software using computer vision. The testing input determination engine 508 can determine testing input based on user interactions determined from an applicable engine for determining user interactions, such as the user interaction identification engines described in this paper. For example, if user interactions indicate a user activated a specific graphical element, then the testing input determination engine 508 can determine testing input to include activating the specific graphic element in performance testing the software based on the user interactions. In another example, if user interactions indicate a user utters an auditory command for software to function a specific way, then the testing input determination engine 508 can generate testing input to include executing the software in the specific way, as part of performance testing the software.

In a specific implementation, the testing input determination engine 508 functions to identify testing input based on input received from a user. For example, if user input indicates a user wants to performance test software by performing specific functions, then the testing input determination engine 508 can identify testing input indicating the specific functions to perform in performance testing the software. In identifying testing input based on user input, the testing input determination engine 508 can generate testing input from a test harness provided by the user as part of user input. For example, if a test harness indicates specific functions to perform in executing software as part of performance testing the software, then the testing input determination engine 508 can identify testing input indicating to perform the specific functions.

In a specific implementation, the testing input determination engine 508 functions to identify testing input from testing constraints indicated by received user input. For example, if testing constraints indicate replicating actions across a specific number of Android® phones in parallel at the same time, then the testing input determination engine 508 can generate testing input specifying to replicate the action across a specific number of Android® phones simulated in one or a plurality of testing environments in parallel at the same time. In another example, if testing constraints indicate replicating a denial-of-service attack, then the testing input determination engine 508 can generate testing input indicating to replicate a denial-of service attack in one or more testing environments as part of performance testing software. In yet another example, if testing constraints indicate replicating the software being executed in different specific geographical regions, then the testing input determination engine 508 can generate testing input indicating to replicate the software being executed in the different regions by executing the software in one or a plurality of testing environments as part of performance testing the software.

In the example performance testing computer vision system 502 shown in FIG. 5, the performance testing computer vision-based testing package generation engine 510 is intended to represent an engine that functions to generate data used in performance testing software. In generating data use in performance testing software, the performance testing computer vision-based testing package generation engine 510 can generate a computer vision-based testing package for use in performance testing software. The performance testing computer vision-based testing package generation engine 510 can generate a computer vision-based testing package can generate a computer vision-based testing package based on either or both identified user interactions and determined testing input. For example, if testing input indicates to execute specific code in performance testing software, then the performance testing computer vision-based testing package generation engine 510 can generate a computer vision-based testing package including the testing input indicating to execute the specific code. In another example, if user interaction indicate a user made an auditory command to perform a specific function of the software, then the performance testing computer vision-based testing package generation engine 510 can generate a computer vision-based testing package with input indicating to perform the specific function in performance testing the software. In yet another example, the performance testing computer vision-based package generation engine 510 can generate a computer vision-based testing package to include testing constraints for use in performance testing software.

In a specific implementation, the performance testing computer vision-based testing package generation engine 510 functions to generate data used in performance testing software based on received user input. In utilizing user input to generate data used in performance testing software, the performance testing computer vision-based testing package generation engine 510 can use code of software provided as part of user input. For example, the performance testing computer vision-based testing package generation engine 510 can include provided code for performing functions in performance testing software, as part of a computer vision-based testing package. Further, in utilizing user input to generate data used in performance testing software, the performance testing computer vision-based testing package generation engine 510 can utilize a test harness, provided as user input. For example, if a user provides a test harness including testing constraints, then the performance testing computer vision-based testing package generation engine 510 can generate a computer vision-based testing package including the testing constraints, according to the test harness. In another example, if a user provides testing constrains for conducting performance testing of software, then the performance testing computer vision-based testing package generation engine 510 can generate a package including testing input indicating the testing constraints.

In a specific implementation, the performance testing computer vision-based testing package generation engine 510 functions to generate a script package as part of a computer vision-based testing package for use in performance testing software. In generating a script package as part of a computer vision-based testing package, the performance testing computer vision-based testing package generation engine 510 can generate script to execute in controlling performance testing of software. The performance testing computer vision-based testing package generation engine 510 can generate script included as part of a script package according to one or an applicable combination of identified user interactions, received user input, and determined testing input. For example, if user interactions indicate a user activated a specific graphical element in a graphical representation of output of executing software, then the performance testing computer vision-based testing package generation engine 510 can generate script associated with, or otherwise causing, activation of the graphical element when the software is under performance testing. In another example, if user input indicates functions associated with activation in a graphical element of a graphical representation of output of executing software, then the performance testing computer vision-based testing package generation engine 510 can generate script to cause the specific functions to be performed in performance testing the software.

In a specific implementation, the performance testing computer vision-based testing package generation engine 510 functions to use computer vision to generate data used in performance testing software. The performance testing computer vision-based testing package generation engine 510 can use computer vision to generate a computer vision-based testing package and a script package. For example, the performance testing computer vision-based testing package generation engine 510 can use computer vision to determine changes to a graphical representation of output of executing software as the user interacts with the graphical representation of the output. Further in the example, the performance testing computer vision-based testing package generation engine 510 can generate script to include in a script package based on the changes to the graphical representation determined using computer vision.

In the example performance testing computer vision system 502 shown in FIG. 5, the computer vision-based testing package datastore 512 is intended to representation a datastore that functions to store computer vision-based testing package data. Computer vision-based testing package data includes computer vision-based testing packages and script packages used in performance testing software. Computer vision-based testing package data stored in the computer vision-based testing package datastore 512 can be generated by an applicable engine for generating data used in performance testing software, such as the performance testing computer vision-based testing package generation engines described in this paper. Additionally, computer vision-based testing package data stored in the computer vision-based testing package datastore 512 can include a modified computer vision-based testing package, e.g. modified through performance testing of software.

In an example of operation of the example performance testing computer vision system 502 shown in FIG. 5, the testing communication engine 504 receives event data including at least one image of a user interacting with a graphical representation of output of executing software. In the example of operation of the example system shown in FIG. 5, the user interaction identification engine 506 determines user interactions with the graphical representation of the output of the executing software by applying computer vision to the at least one image of the user interacting with the graphical representation of the output of the executing software. Further, in the example of operation of the example system shown in FIG. 5, the testing input determination engine 508 determines testing input for use in controlling performance testing of the software based on the determined user interactions with the graphical representation of the output of the executing software. In the example of operation of the example system shown in FIG. 5, the performance testing computer vision-based testing package generation engine 510 uses computer vision and the determined testing input to generate a computer vision-based testing package for use in controlling performance testing of the software. Additionally, in the example of operation of the example system shown in FIG. 5, the computer vision-based testing package datastore 512 stores computer vision-based testing package data indicating the computer vision-based testing package generated by the performance testing computer vision-based testing package generation engine 510. In the example of operation of the example system shown in FIG. 5, the testing communication engine 504 provides the computer vision-based testing package data indicating the computer vision-based testing package generated by the performance testing computer vision-based testing package generation engine 510 to an applicable system for managing performance testing of software in one or more testing environments, such as the computer vision-based performance testbed systems described in this paper.

Figure 6:
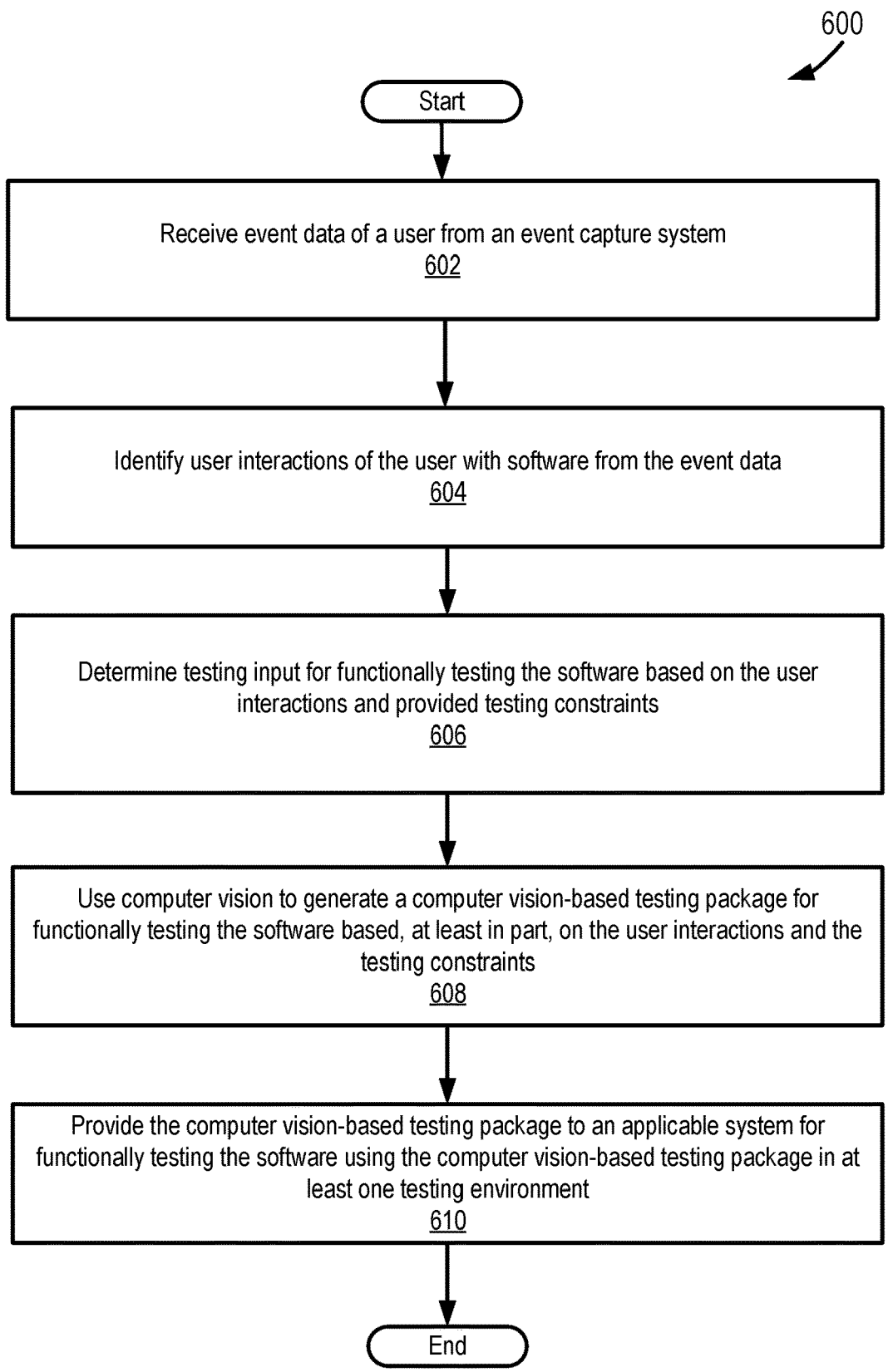
FIG. 6 depicts a flowchart of an example of a method for generating data used in performance testing software using computer vision.

FIG. 6 depicts a flowchart 600 of an example of a method for generating data used in performance testing software using computer vision. The flowchart 600 begins at module 602, where event data of a user is received from an event capture system. An applicable system for communicating for purposes of performance testing software using computer vision, such as the testing communication engines described in this paper, can receive event data of a user from, an event capture system. Received event data can include at least one image of a user interacting with either or both a graphical representation of an abstraction of software to be performance tested and of an output of executing software to be performance tested. For example, event data can include at least one image of a user interacting with a mockup of a website to be performance tested. In another example, event data can include at least one image of a user activating graphical elements in a graphical representation of an output of executing software under performance testing.

The flowchart 600 continues to module 604, where user interactions of the user are identified from the event data. An applicable engine for determining user interactions of a user for purposes of performance testing software, such as the user identification engines described in this paper, can determine user interactions of the user from the event data. User interactions of the user with a graphical interface can be determined by applying computer vision to the event data. For example, user interactions of a user with a graphical representation of an output of executing software can be determined by applying computer vision to the event data. In another example, user interactions of a user with a graphical representation of an abstraction of software can be determined by applying computer vision to the event data. Additionally, user interactions including auditory commands uttered by a user can be determined from the event data.

The flowchart 600 continues to module 606, where testing input for performance testing the software is determined based on the identified user interactions and received testing constraints. An applicable engine for determining testing input for use in performance testing the software, such as the testing input determination engines described in this paper, can determine testing input for performance testing the software based on the user interactions and received testing constraints. In determining testing input for performance testing the software, the testing input can be generated to cause the software to execute based on the user interactions as part of performance testing the software. For example, if a user activates a graphical element in interacting with software, then testing input can be generated to cause the software to execute as if the user activates the graphical element as part of performance testing the software. In another example, if a user utters a vocal command to cause the software to perform a specific function, then testing input can be generated to cause the software to execute in performing the specific function as part of performance testing the software. Additionally, in determining testing input for performance testing the software, the testing input can be generated to specify creation of a testing environment and control of the testing environment, e.g. the software executing in the environment, based on the testing constraints.

The flowchart 600 continues to module 608, where computer vision is used to generate a computer vision-based testing package for performance testing the software, based at least in part, on the user interactions and the testing constraints. An applicable engine for generating data used in performance testing software, such as the performance testing computer vision-based testing package generation engines described in this paper, can generate data used in performance testing the software, based at least in part, on the user interactions and the testing constraints. A computer vision-based testing package for performance testing the software can be generated based on the determined testing input. For example, a computer vision-based testing package can be generated to include the determined testing input for use in controlling execution of the software as part of performance testing the software. Additionally, in using computer vision to generate a computer vision-based testing package, computer vision can be applied to determine changes in a graphical representation of output of executing software for purposes of generating a computer vision-based testing package. For example, computer vision can be applied to changes in a graphical representation of output of executing software to generate script for use in executing the software as part of performance testing the software.

The flowchart 600 continues to module 610, where the computer vision-based testing package is provided to an applicable system for performance testing the software using the computer vision-based testing package in at least one testing environment. An applicable engine for communicating for purposes of performance testing software using computer vision, such as the testing communication engines described in this paper, can provide the computer vision-based testing package to an applicable system for performance testing the software using the computer vision-based testing package. An applicable system for performance testing software using a computer vision-based testing package, such as the computer vision-based performance testbed systems described in this paper, can receive the computer vision-based testing package for use in performance testing the software in at least one testing environment using the package.

Figure 7:
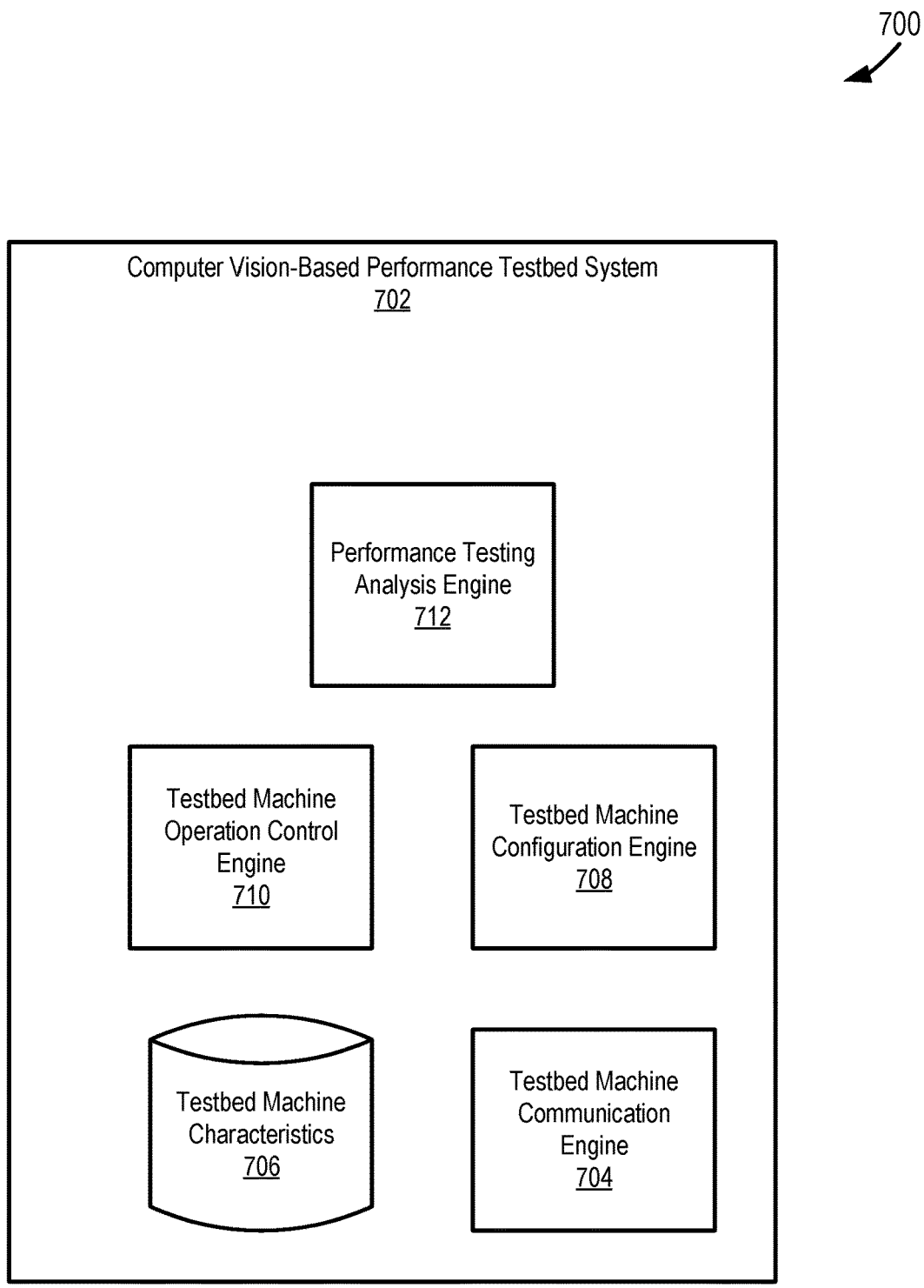
FIG. 7 depicts a diagram of an example computer vision-based performance testbed system.

FIG. 7 depicts a diagram 700 of an example computer vision-based performance testbed system 702. The computer vision-based performance testbed system 702 is intended to represent a system that functions to manage performance testing of software in a testing environment created on a testbed machine using computer vision, such as the computer vision-based performance testbed systems described in this paper. In managing performance testing of software in a testing environment based on computer vision, the computer vision-based performance testbed system 702 can receive data used in controlling performance testing of software. For example, the computer vision-based performance testbed system 702 can receive a computer vision-based testing package for use in performance testing software. In another example, the computer vision-based performance testbed system 702 can receive a script package including script used in performance testing software in one or a plurality of testing environments. The computer vision-based performance testbed system 702 can receive data used in performance testing software from an applicable system for generating data used in testing software using computer vision, such as the performance testing computer vision systems described in this paper.

In a specific implementation, in managing performance testing of software on a testbed machine, the computer vision-based performance testbed system 702 functions to determine and subsequently provide performance testing results to a user. For example, the computer vision-based performance testbed system 702 can determine performance testing results indicating software has been performance tested. In another example, the computer vision-based performance testbed system 702 can determine performance testing results indicating differences in software executed in different testing environments as part of performance testing the software. The computer vision-based performance testbed system 702 can conduct performance testing analysis to generate performance testing results data. For example, the computer vision-based performance testbed system 702 can generate can generate performance testing results data indicating areas in a graphical representation of output of software that change past a certain threshold degree in performance testing the software. The computer vision-based performance testbed system 702 can use an output of performance tested software to determine performance testing results.

In a specific implementation, the computer vision-based performance testbed system 702 functions to use computer vision to identify performance testing results. The computer vision-based performance testbed system 702 can apply computer vision to an output of performance tested software to determine an area in a graphical representation of the output that changes based on either or both a frequency and a degree to which the areas changes in the graphical representation. For example, if an area in a graphical representation of an output of executing software changes beyond a threshold degree, then the computer vision-based performance testbed system 702 can generate performance testing results highlighting the area in the graphical representation of the output. Additionally, the computer vision-based performance testbed system 702 can apply computer vision to an output of software executed multiple times to identify performance testing results. For example, the computer vision-based performance testbed system 702 can apply computer vision to an output of software executed in the same or different testing environments multiple times to determine areas that change when the software is executed multiple times to identify performance testing results.

In a specific implementation, the computer vision-based performance testbed system 702 functions to set up one or a plurality of testing environments on one or a plurality of virtualized testbed machines for purposes of performance testing software. For example, the computer vision-based performance testbed system 702 can set up a plurality of testing environments simulating a plurality of smart phones, potentially of the same type or different type for purposes of performance testing software. The computer vision-based performance testbed system 702 can set up one or a plurality testing environments on one or a plurality of virtualized testbed machines according to testbed machine characteristics indicated by testing constraints. For example, if testbed machine characteristics receives from a user indicate to performance test software n iPhones®, then the computer vision-based performance testbed system 702 can set up one or a plurality of virtualized testbed machines to create one or a plurality of testing environments emulating the n iPhones®.

In a specific implementation, the computer vision-based performance testbed system 702 functions to control execution of software in one or a plurality of testing environments set up on one or a plurality of virtualized testbed machines for purposes of performance testing software. The computer vision-based performance testbed system 702 can control execution of software in one or a plurality of testing environments according to received testing input, e.g. included as part of a computer vision-based testing package. For example, if testing constraints specify to simulate a denial-of-service attack, then the computer vision-based performance testbed system 702 can control execution of software in one or a plurality of testing environments to simulate a denial-of-service attack. In another example, if testing constraints specify operational parameters to stress test software, then the computer vision-based performance testbed system 702 can control execution of the software in one or a plurality of testing environments according to the operational parameters for purposes of stress testing the software. In yet another example, if testing constraints specify to perform split testing on two versions of software, then the computer vision-based performance testbed system 702 can execute the two version of software in one or different testing environments for purposes of split testing the software.

The example computer vision-based performance testbed system 702 shown in FIG. 7 includes a testbed machine communication engine 704, a testbed machine characteristics datastore 706, a testbed machine configuration engine 708, a testbed machine operation control engine 710, and a performance testing analysis engine 712. The testbed machine communication engine 704 in the example computer vision-based performance testbed system 702 shown in FIG. 7 is intended to represent an engine that functions to send and receive data used in performance testing software in one or more testing environments. The testbed machine communication engine 704 can receive a computer vision-based testing package for use in performance testing software. For example, the testbed machine communication engine 704 can receive a script package including script used in performance testing software in one or more testing environments.

In a specific implementation, the testbed machine communication engine 704 functions to provide performance testing results to a user. In providing performance testing results to a user, the testbed machine communication engine 704 can provide performance testing results data generated through performance testing analysis. For example, the testbed machine communication engine 704 can provide performance testing results data indicating areas in a graphical representation of output of software that change when software is executed across a plurality of testing environments as part of performance testing the software. Additionally, the testbed machine communication engine 704 can provide performance testing results data generated using performance testing analysis by applying computer vision to an output of software performance tested. For example, the testbed machine communication engine 704 can provide performance testing results data indicating a response of software to a soak test conducted as part of performance testing the software.

In a specific implementation, the testbed machine communication engine 704 functions to receive modification input. The testbed machine communication engine 704 can receive modification input including recovery input generated according to recovery strategies for purposes of recovering a flow of execution of software in performance testing the software in one or more testing environments. For example, the testbed machine communication engine 704 can receive recovery input indicating modifications to make to code or script for recovering a flow of execution of software in performance testing the software. Additionally, the testbed machine communication engine 704 can receive a modified computer vision-based testing package for use in performance testing software. For example, the testbed machine communication engine 704 can receive a computer vision-based testing package modified by a user based on performance testing of software.

In a specific implementation, the testbed machine communication engine 704 functions to receive testbed machine characteristics. The testbed machine communication engine 704 can receive testbed machine characteristics as part of testing constraints of testing input. Testbed machine characteristics received by the testbed machine communication engine 704 can be utilized in configuring a virtualized testbed machine for purposes of performance testing software. For example, testbed machine characteristics received by the testbed machine communication engine 704 can specify to configure a virtualized testbed machine to operate as an Android® device with a specific screen size, and the virtualized testbed machine can subsequently be configured to operate as an Android® device with the specific screen size. Testbed machine characteristics can be received by the testbed machine communication engine 704 as either or both part of a computer vision-based testing package and input from a user.

The testbed machine characteristics datastore 706 in the example computer vision-based performance testbed system 702 shown in FIG. 7 functions according to an applicable datastore for storing testbed machine characteristics data. Testbed machine characteristics data stored in the testbed machine characteristics datastore 706 can be used to configure a virtualized testbed machine to create one or a plurality of testing environments for purposes of performance testing software. Testbed machine characteristics data stored in the testbed machine characteristics datastore 706 can be received or otherwise determined from data received from an applicable engine for communicating for purposes of performance testing software on a testbed machine, such as the testbed machine communication engines described in this paper. For example, testbed machine characteristics data stored in the testbed machine characteristics datastore 706 can be determined from either or both received user input and testing input included as part of a received computer vision-based testing package.

The testbed machine configuration engine 708 in the example computer vision-based performance testbed system 702 shown in FIG. 7 is intended to represent an engine that functions to configure a virtualized testbed machine for performance testing software. The testbed machine configuration engine 708 can configure a virtualized testbed machine according to testbed machine characteristics. For example, if user input indicates to performance test software on an iOS® machine, then the testbed machine configuration engine 708 can configure a virtualized testbed machine to operate using iOS® for purposes of performance testing the software on the virtualized testbed machine. In another example, the testbed machine configuration engine 708 can configure a testbed machine to operate as if it is in different geographical regions. In configuring a virtualized testbed machine for performance testing software, the testbed machine configuration engine 708 can configure a plurality of different virtualized testbed machines to performance test software in one or more testing environments, potentially simultaneously. For example, the testbed machine configuration engine 708 can configure a first virtualized testbed machine to operate as an iOS® device for performance testing software, and a second virtualized testbed machine to operate as an Android® device for concurrently performance testing the software.

The testbed machine operation control engine 710 in the example computer vision-based performance testbed system 702 shown in FIG. 7 is intended to represent an engine that functions to manage performance testing of software in a testing environment on a virtualized testbed machine. The testbed machine operation control engine 710 can use a computer vision-based testing package to generate output in performance testing software on a virtualized testbed machine. For example, the testbed machine operation control engine 710 can execute code included as part of a computer vision-based testing package on a virtualized testbed machine according to testing input to generate testing output as part of performance testing software. In another example, the testbed machine operation control engine 710 can execute script included as part of a script package on a virtualized testbed machine according to testing input to generate testing output as part of performance testing software.

In a specific implementation, the testbed machine operation control engine 710 functions to control performance testing of software in one or a plurality of testing environments based on testing constraints. More specifically, the testbed machine operation control engine 710 can control performance testing of software based on testing constraints included as part of a computer vision-based testing package. The testbed machine operation control engine 710 can control performance testing of software to facilitate one or a combination of stress testing, soak testing, spike testing, configuration testing, and isolation testing of the software. For example, the testbed machine operation control engine 710 can control performance testing of different versions of software by executing the different version to perform A/B testing of the software.

In a specific implementation, the testbed machine operation control engine 710 functions to either or both modify and generate code and script of software as part of performance testing the software. The testbed machine operation control engine 710 can modify or generate code and script of software based on results of performance testing software. For example, if in performance testing software a function of the software fails, then the testbed machine operation control engine 710 can modify code of the software in order to correct the function of the software. In another example, the testbed machine operation control engine 710 can generate code in performance testing software according to testing input. In modifying and generating code and script of software as part of performance testing the software, the testbed machine operation control engine 710 can modify a computer vision-based testing package used in performance testing the software. For example, the testbed machine operation control engine 710 can modify a script package used in performance testing software by modifying code used in executing the software and included as part of the script package.

In a specific implementation, the testbed machine operation control engine 710 functions to modify code or script as part of performance testing software based on received modification input. Modification input can be received from an applicable source, such as a user of a client device or an applicable system for performing automated recovery of a flow of executing software in performance testing the software, such as the functional flow testing triage systems described in this paper. For example, modification input can include user input indicating modifications to make to code of software in response to problems identified through performance testing of the software. In another example, modification input can include recovery input indicating steps to take, including script modifications to make, in recovering a flow of executing software in performance testing the software.

The performance testing analysis engine 712 in the example computer vision-based performance testbed system 702 shown in FIG. 7 is intended to represent an engine that functions to manage analysis of performance testing of software in one or a plurality of testing environments on one or a plurality of virtualized testbed machines. In managing analysis of performance testing of software, the performance testing analysis engine 712 can conduct performance testing analysis to generate performance testing results of performance testing software. For example, the performance testing analysis engine 712 can generate performance testing results indicating differences in A/B testing of different versions of software identified through performance testing of the software. In another example, the performance testing analysis engine 712 can generate performance testing results including data used in producing a graphical representation of an output of performance testing software on a virtualized testbed machine. Further in the another example, the performance testing analysis engine 712 can generate performance testing results including data used in producing a graphical representation of an output of executing either or both code and script in performance testing software on one or a plurality of virtualized testbed machines.

In a specific implementation, the performance testing analysis engine 712 functions to control performance testing analysis by comparing an actual output of executing software as part of performance testing the software to an expected output of executing the software according to testing input. In comparing an actual output to an expected output of executing software, the performance testing analysis engine 712 can compare a graphical representation of the actual output of the executing software to a graphical representation of the expected output of the executing software as part of performance testing the software. For example, the performance testing analysis engine 712 can compare an element in a graphical representation of an actual output of executing software with an element in a graphical representation of an expected output of executing the software to determine either or both a frequency at which the element changes or a degree to which the element changes, as part of conducting performance testing analysis of the software. In another example, the performance testing analysis engine 712 can compare conflicting script and identify which script is conflicting as part of performance testing software.

In a specific implementation, the performance testing analysis engine 712 functions to conduct performance testing analysis of performance testing of software to generate performance testing results data. The performance testing analysis engine 712 can conduct performance testing analysis by examining output of executing software in response to testing input. In conducting performance testing analysis of performance tested software, the performance testing analysis engine 712 can compare outputs of executing software in one or a plurality of testing environments according to the same testing input. For example, if a dialog box appears when software is executed on a testbed machine a first time and fails to appear when software is executed on the testbed machine a second time, then the performance testing analysis engine 712 can highlight the problem of the dialog box failing to appear, as part of conducting performance testing analysis in performance testing of the software.

In a specific implementation, the performance testing analysis engine 712 functions to use computer vision to conduct performance testing analysis of software. In using computer vision to conduct performance testing analysis of software, the performance testing analysis engine 712 can use computer vision to detect changes in graphical representations of output of software executing as part of performance testing of the software. Specifically, the performance testing analysis engine 712 can use computer vision to detect either or both a frequency and a degree to which elements change in a graphical representation of an output of software executing as part of performance testing the software.

In a specific implementation, the performance testing analysis engine 712 functions to conduct performance testing analysis based on a frequency at which elements change in a graphical representation of output of software executing on a testbed machine as part of performance testing. Specifically, as part of conducting performance testing analysis, the performance testing analysis engine 712 can highlight elements that change frequently or fail to change frequently in a graphical representation of output of software executing in one or a plurality of testing environments multiple times. Additionally, as part of conducting performance testing analysis based on a frequency at which elements change, the performance testing analysis engine 712 can highlight elements that change frequently or infrequently in a graphical representation of output of software executing multiple times in one or a plurality of testing environments according to the same testing input.

In a specific implementation, the performance testing analysis engine 712 functions to conduct performance testing analysis based on a degree of change of an element in a graphical representation of output of software executing as part of performance testing of the software. Specifically, as part of conducting performance testing analysis, the performance testing analysis engine 712 can highlight elements that change a specific amount in a graphical representation of output of software executing multiple times, potentially in multiple testing environments. For example, if an element of a graphical representation of an output of executing software changes in size greater than specific threshold amounts when the software is executed multiple times, then the performance testing analysis engine 712 can highlight the element. Additionally, as part of conducting performance testing analysis based on a degree of change of elements, the performance testing analysis engine 712 can highlight elements in a graphical representation of output of software executing multiple times according to the same testing input based on the degree in which the elements change in the graphical representation when the software is executed multiple times.

In a specific implementation, the performance testing analysis engine 712 functions to generate performance testing results by conducting performance testing analysis of software executing in one or a plurality of testing environments as part of performance testing. The performance testing analysis engine 712 can determine performance testing results of one or a combination of stress testing software, soak testing software, spike testing software, configuration testing software, and isolation testing software. Additionally, the performance testing analysis engine 712 can determine or estimate portions of software that fail as part of performance testing the software.

In an example of operation of the example computer vision-based performance testbed system 702 shown in FIG. 7, the testbed machine communication engine 704 receives a computer vision-based testing package for use in performance testing software. In the example of operation of the example system shown in FIG. 7, the testbed machine characteristics datastore 706 stores testbed machine characteristics data indicated by the computer vision-based testing package. Further, in the example of operation of the example system shown in FIG. 7, the testbed machine configuration engine 708 configures one or more testing environments on one or more virtualized testbed machines according to the testbed machine characteristics data stored in the testbed machine characteristics datastore 706. In the example system shown in FIG. 7, the testbed machine operation control engine 710 manages performance testing of the software on in the one or more testing environments using the computer vision-based testing package. Additionally, in the example of operation of the example system shown in FIG. 7, the performance testing analysis engine 712 generates performance testing results of performance testing the software in the one or more testing environments. In the example of operation of the example system shown in FIG. 7, the testbed machine communication engine 704 provides the performance testing results to a user through a client device associated with the user.

Figure 8:
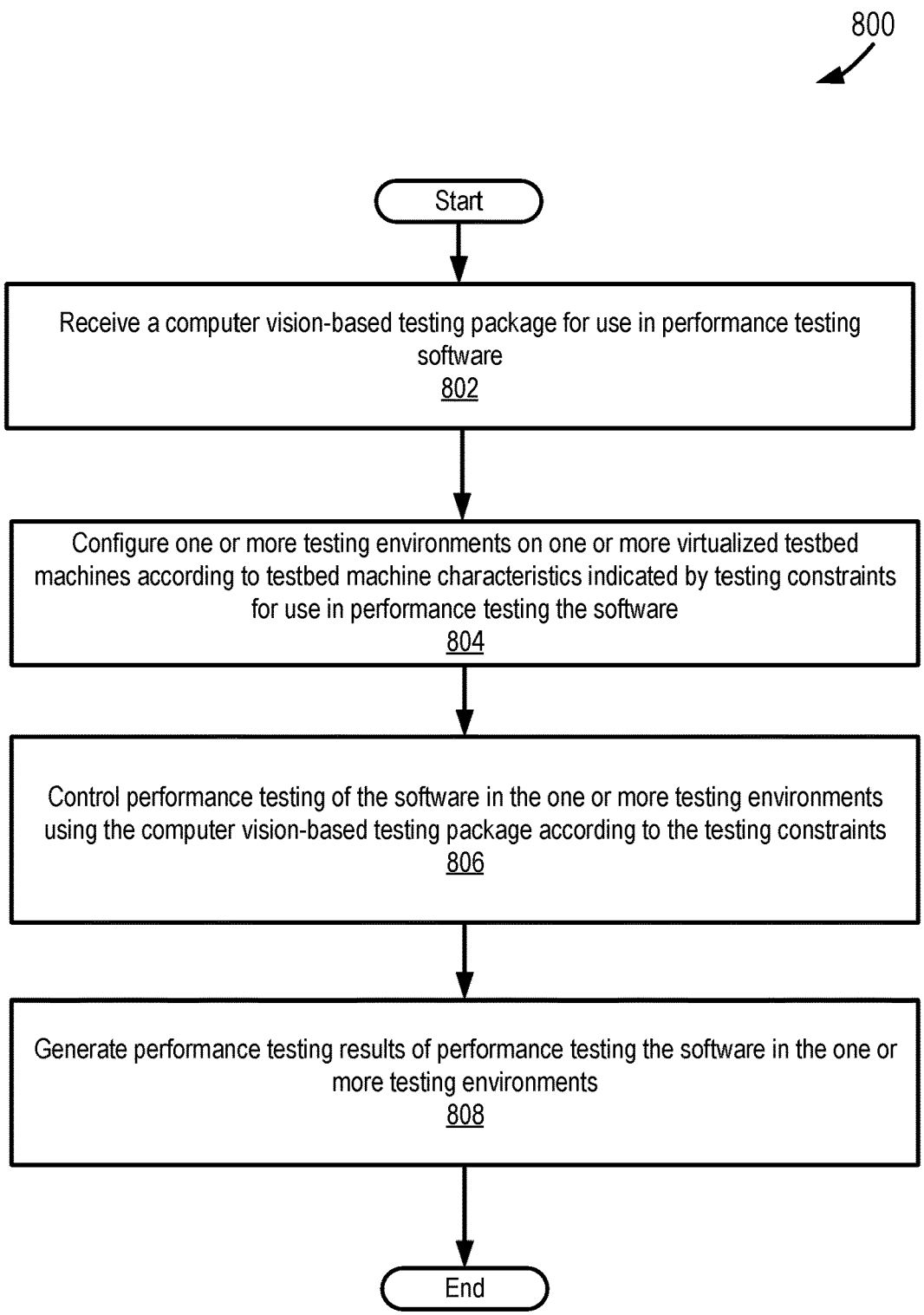
FIG. 8 depicts a flowchart of an example of a method for performance testing software in one or more testing environments on one or more virtualized testbed machines using a computer vision-based testing package.

FIG. 8 depicts a flowchart 800 of an example of a method for performance testing software in one or more testing environments on one or more virtualized testbed machines using a computer vision-based testing package. The flowchart 800 begins at module 802, where a computer vision-based testing package for use in performance testing software is received. A computer vision-based testing package for use in performance testing software can be received from an applicable system for generating, through computer vision, data used in performance testing software, such as the performance testing computer vision systems described in this paper. A computer vision-based testing package for use in performance testing software can be received by an applicable engine for communicating for purposes of performance testing software in one or more testing environments on one or more virtualized testbed machines, such as the testbed machine communication engines described in this paper. A received computer vision-based testing package can include testing input including testing constraints and script capable of being executed according to the testing input for purposes of performance testing the software.

The flowchart 800 continues to module 804, where one or more testing environments on one or more virtualized testbed machines is configured according to testbed machine characteristics indicated by testing constraints for use in performance testing the software. An applicable engine for configuring a virtualized testbed machine for performance testing software, such as the testbed machine configuration engines described in this paper, can configure one or more testing environments on one or more virtualized testbed machines according to testbed machine characteristics indicated by testing constraints. One or more testing environments can be configured on one or more virtualized testbed machines according to testbed machine characteristics indicated by testing constraints included in either or both user input and the computer vision-based testing package.

The flowchart 800 continues to module 806, where performance testing of the software in the one or more testing environments is controlled using the computer vision-based testing package. An applicable engine for managing performance testing of software in a testing environment on a virtualized testbed machine, such as the testbed machine operation control engines described in this paper, can manage performance testing of the software in the one or more testing environments using the computer vision-based testing package according to the testing constraints. In managing performance testing of the software in the one or more testing environments, code or script can be executed on the one or more virtualized testbed machines according to testing constraints to generate output. Further, code or script included in the computer vision-based testing package can be executed on the one or more virtualized testbed machines according to testing input included as part of the testing package.

The flowchart 800 continues to module 808, where performance testing results of performance testing the software in the one or more testing environments are generated. An applicable engine for generating performance testing results of performance testing software on a virtualized testbed machine, such as the performance testing analysis engines described in this paper, can generate performance testing results of performance testing the software in the one or more testing environments. Performance testing results can be generated by conducting performance testing analysis of the performance testing of the software in the one or more testing environments. Further, performance testing results can be generated by applying computer vision to an output of performance testing the software in the one or more testing environments.

Figure 9:
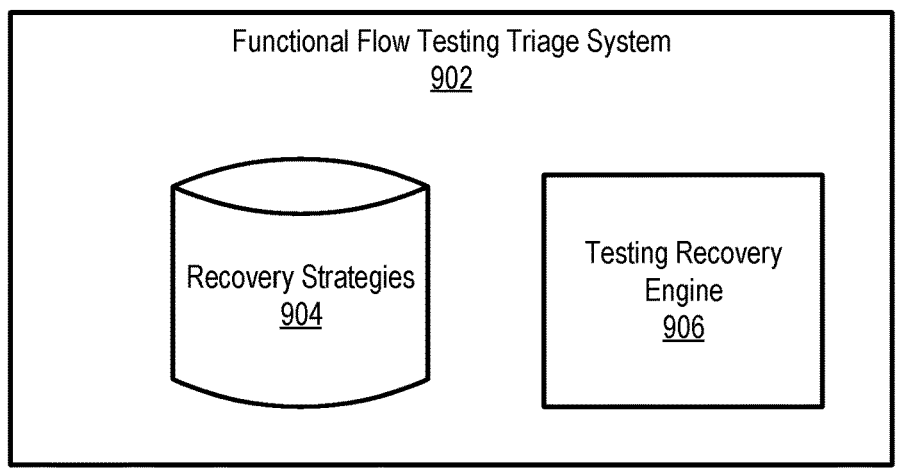
FIG. 9 depicts a diagram of an example of a functional flow testing triage system.

FIG. 9 depicts a diagram 900 of an example of a functional flow testing triage system 902. The example functional flow testing triage system 902 is intended to represent an applicable system that functions to automatically perform recovery of a flow of executing software under performance test, such as the functional flow testing triage systems described in this paper. The functional flow testing triage system 902 can use an output of software under test in performing automatic recovery of a flow of the executing software. For example, the functional flow testing triage system 902 can compare an actual output of software under test to an expected output to determine steps or remedies to take in automatically recovering a flow of the software executing under test. Additionally, the functional flow testing triage system 902 can automatically perform recovery of a flow of executing software under test according to recovery strategies. Further, in automatically performing recovery of a flow of executing software under test, the functional flow testing triage system 902 can generate and provide recovery input for use in recovering the flow of the executing software under test. For example, the functional flow testing triage system 902 can provide recovery input including either or both modified code or script and instructions for modifying code or script for use in automatically recovering a flow of executing software under test.

The functional flow testing triage system 902 shown in FIG. 9 includes a recovery strategies datastore 904 and a testing recovery engine 906. The recovery strategies datastore 904 in the example functional flow testing triage system 902 shown in FIG. 9 is intended to represent a datastore that functions to store recovery strategies data indicating recovery strategies. Recovery strategies data stored in the recovery strategies datastore 904 indicates recovery strategies for use in automatically recovering a flow of software executing under performance testing. For example, recovery strategies data stored in the recovery strategies datastore 904 can indicate script to modify in order to remedy an observed problem or stoppage in a flow of executing software under performance testing. Recovery strategies indicated by recovery strategies data stored in the recovery strategies datastore 904 can be specific to one or a combination of an identification of software under test, a type of software under test, functions being tested as part of software being tested, an expected output of software in testing the software, an actual output of software in testing the software, differences between an actual and expected output of software in testing the software, and testing constraints used to control testing of the software. For example, recovery strategies data stored in the recovery strategies datastore 904 can indicate that if a specific function is not executing properly in testing software, then specific remedial steps should be taken to recover the flow of executing of the software in testing the software.

The testing recovery engine 906 in the example functional flow testing triage system 902 shown in FIG. 9 is intended to represent an engine that functions to automatically perform recovery of a flow of executing software under test. In automatically performing recovery of a flow of executing software under test, the testing recovery engine 906 can generate and provide recovery input for us in automatically performing recovery of a flow of executing software under test. For example, the testing recovery engine 906 can provide recovery input indicating modifications to make to executing script in order to automatically recover a flow of the executing script of software under performance testing. The testing recovery engine 906 can generate and provide recovery input to an applicable engine for controlling testing of software on a virtualized testbed machine, such as the testbed machine operation control engines described in this paper. The testing recovery engine 906 can generate recovery input based on recovery strategies. For example, if recovery strategies indicate specific steps to take if a function fails in the execution of software under performance testing, then the testing recovery engine 906 can generate recovery input instructing how to take the specific steps indicated by the recovery strategies.

In a specific implementation, the testing recovery engine 906 functions to automatically perform recovery of a flow of executing software under performance testing based on output of executing the software in performance testing the software. The testing recovery engine 906 can compare an actual output of executing software with an expected output of executing the software to perform recovery of a flow of execution of the software in performance testing the software. For example, the testing recovery engine 906 can determine ways in which software is not operating as expected, e.g. from performance testing results generated by comparing actual and expected output, and subsequently generate recovery input for use in recovering a flow of execution of the software in performance testing the software. Additionally, the testing recovery engine 906 can use application of computer vision to output of executing software for purposes of performance testing the software to perform recovery of a flow of execution of the software. For example, the testing recovery engine 906 can use an identification that an element is not functioning properly, e.g. as identified by performance testing results and recognized through computer vision, to perform recovery of a flow of execution of the software for purposes of performance testing the software.

In an example of operation of the example functional flow testing triage system 902 shown in FIG. 9, the recovery strategies datastore 904 stores recovery strategies data indicating recovery strategies to follow in recovery a flow of execution of software under performance testing. In the example of operation of the example system shown in FIG. 9, the testing recovery engine 906 automatically performs recovery of the flow of the execution of the software under performance testing according to the recovery strategies indicated by the recovery strategies data stored in the recovery strategies datastore 904.

Figure 10:
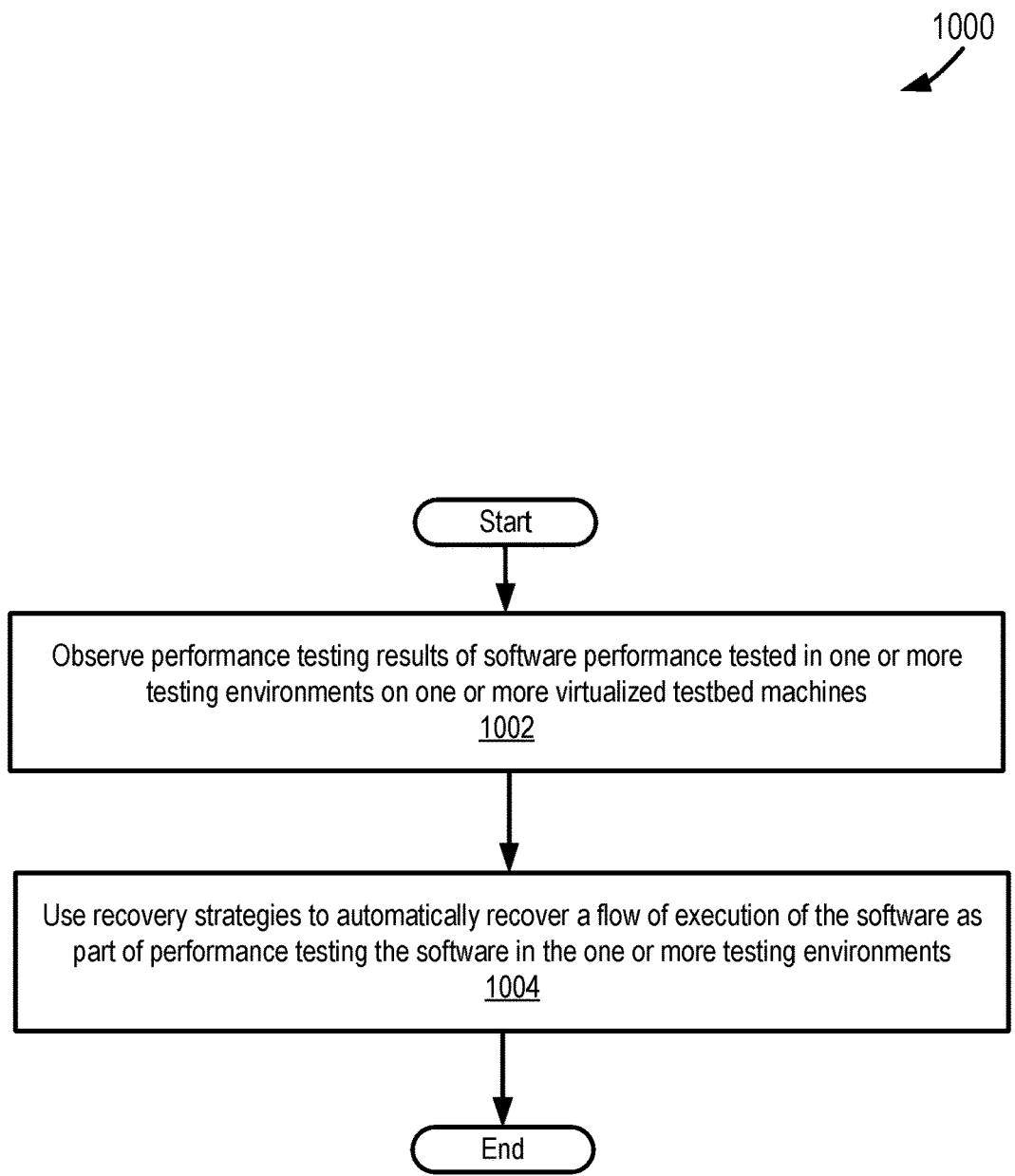
FIG. 10 depicts a flowchart of an example of a method for automatically performing recovery of executing software under performance testing.

FIG. 10 depicts a flowchart 1000 of an example of a method for automatically performing recovery of executing software under performance testing. The flowchart 1000 begins at module 1002, where performance testing results of software performance tested in one or more testing environments on one or more virtualized testbed machines are observed. An applicable engine for performing automatic recovery of a flow of executing software under performance testing, such as the testing recovery engines described in this paper, can observe performance testing results of software performance tested in one or more testing environments on one or more virtualized testbed machines. In observing performance testing results of software performance tested in one or more testing environments on one or more virtualized testbed machines, an output of performance testing the software can be observed. For example, a graphical representation of an output of software performance tested in one or more testing environments on one or more virtualized testbed machines can be observed.

The flowchart 1000 continues to module 1004, where recovery strategies are used to automatically recover a flow of execution of the software as part of performance testing the software in the one or more testing environments. An applicable engine for performing automatic recovery of a flow of executing software under performance testing, such as the testing recovery engines described in this paper, can use recovery strategies to automatically recover a flow of execution of the software as part of performance testing the software in the one or more testing environments. For example, recovery input can be generated based on recover strategies and subsequently provided for use in automatically recovering a flow of execution of the software as part of performance testing the software in the one or more testing environments.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

I claim:

1. A method comprising:
    presenting to a user through a client device a graphical representation of an output of executing software;
    capturing at least one image of the user interacting with the graphical representation of the output of the executing software;
    applying computer vision to the at least one image to identify graphical elements in the graphical representation of the output of the executing software;
    applying computer vision to the at least one image to identify user interactions with the graphical elements in the graphical representation of the output of the executing software based on the graphical elements identified in the graphical representation of the output of the executing software;
    receiving user input indicating testing constraints for performance testing the software;
    generating a script package based on the user interactions with the graphical elements in the graphical representation of the output of the executing software and the testing constraints;
    forming one or more testing environments on one or more virtualized testbed machines according to the testing constraints;
    performance testing the software in the one or more testing environments according to the testing constraints using the script package;
    conducting performance testing analysis by applying computer vision to output generated by executing the script package a plurality of times in the one or more testing environments, the performance testing analysis detecting a frequency in which the graphical elements change and a degree to which the graphical elements change; and
    generating performance testing results based on the detected frequency in which the graphical elements change and the degree to which the graphical elements change.

2. The method of claim 1, wherein the script package includes first script for executing a first version of the software and second script for executing a second version of the software, the method further comprising:
  executing the first script corresponding to the first version of the software in a first testing environment of the one or more environments;
  executing the second script corresponding to the second version of the software in a second testing environment of the one or more environments concurrently with executing the first script in the first testing environment; and
  comparing first output of executing the first script in the first testing environment to second output of executing the second script in the second testing environment to split test the software as part of performance testing the software.

3. The method of claim 1, further comprising:
  receiving the user input including a test harness for controlling performance testing of the software; and
  generating the script package based on the test harness to include the testing input generated based on the test harness.

4. The method of claim 1, wherein the testing constraints include operation parameters for performing one or a combination of stress testing the software, soak testing the software, spike testing the software, configuration testing the software, and isolation testing the software.

5. The method of claim 1, wherein the testing constraints specify emulating a plurality of devices of the same type in the one or more testing environments, and the software is performance tested across the plurality of devices by simultaneously executing the script across the plurality of devices.

6. The method of claim 1, wherein the performance testing results include:
  the graphical elements highlighted based on the detected frequency in which the graphical elements change and a degree to which the graphical elements change.

7. The method of claim 1, wherein the testing constraints specify simulating a denial-of-service attack as part of performance testing the software and the one or more testing environments are controlled to simulate the denial-of-service attack.

8. The method of claim 1, wherein the testing constraints are defined by the user.

9. The method of claim 1, further comprising:
  executing the script in the script package in the one or more testing environments according to the testing constraints as part of performance testing the software;
  generating performance testing results based on execution of the script in the script package in the one or more testing environments as part of performance testing the software; and
  providing the performance testing results to the user.

10. The method of claim 1, further comprising:
  conducting performance testing analysis by comparing a plurality of testing environments of the one or more testing environments in which the script package is executed according to the testing constraints; and
  generating performance testing results based on a comparison of the plurality of testing environments in which the script package is executed according to the testing constraints.

11. A system comprising:
  a client device configured to present to a user a graphical representation of an output of executing software;
  an event capture engine configured to capture at least one image of the user interacting with the graphical representation of the output of the executing software;
  a user interaction identification engine configured to:
    apply computer vision to the at least one image to identify graphical elements in the graphical representation of the output of the executing software;
    apply computer vision to the at least one image to identify user interactions with the graphical elements in the graphical representation of the output of the executing software based on the graphical elements identified in the graphical representation of the output of the executing software;
  a testing communication engine configured to receive user input indicating testing constraints for performance testing the software;
  a performance testing computer vision-based testing package generation engine configured to generate a script package based on the user interactions with the graphical elements in the graphical representation of the output of the executing software and the testing constraints;
  a testbed machine configuration engine configured to form one or more testing environments on one or more virtualized testbed machines according to the testing constraints; and
  a testbed machine operation control engine configured to:
    performance test the software in the one or more testing environments according to the testing constraints using the script package;
    conduct performance testing analysis by applying computer vision to output generated by executing the script package a plurality of times in the one or more testing environments, the performance testing analysis detecting a frequency in which the graphical elements change and a degree to which the graphical elements change; and
    generate performance testing results based on the detected frequency in which the graphical elements change and the degree to which the graphical elements change.

12. The system of claim 11, wherein the script package includes first script for executing a first version of the software and second script for executing a second version of the software, the system further comprising:
  the testbed machine operation control engine configured to:
    execute the first script corresponding to the first version of the software in a first testing environment of the one or more environments;
    execute the second script corresponding to the second version of the software in a second testing environment of the one or more environments concurrently with executing the first script in the first testing environment; and
  a performance testing analysis engine configured to compare first output of executing the first script in the first testing environment to second output of executing the second script in the second testing environment to split test the software as part of performance testing the software.

13. The system of claim 11, further comprising:
  the testing communication engine further configured to receive the user input including a test harness for controlling performance testing of the software; and
  the performance testing computer vision-based testing package generation engine further configured to generate the script package based on the test harness to include the testing input generated based on the test harness.

14. The system of claim 11, wherein the testing constraints include operation parameters for performing one or a combination of stress testing the software, soak testing the software, spike testing the software, configuration testing the software, and isolation testing the software.

15. The system of claim 11, wherein the testing constraints specify emulating a plurality of devices of the same type in the one or more testing environments, and the software is performance tested across the plurality of devices by simultaneously executing the script across the plurality of devices.

16. The system of claim 11, wherein the performance testing results include
the graphical elements highlighted based on the detected frequency in which the graphical elements change and a degree to which the graphical elements change.

17. The system of claim 11, wherein the testing constraints specify simulating a denial-of-service attack as part of performance testing the software and the one or more testing environments are controlled to simulate the denial-of-service attack.

18. The system of claim 11, further comprising:
the testbed machine operation control engine further configured to execute the script in the script package in the one or more testing environments according to the testing constraints as part of performance testing the software;
a performance testing analysis engine configured to:
generate performance testing results based on execution of the script in the script package in the one or more testing environments as part of performance testing the software; and
provide the performance testing results to the user.

19. The system of claim 11, further comprising a performance testing analysis engine configured to:
conduct performance testing analysis by comparing a plurality of testing environments of the one or more testing environments in which the script package is executed according to the testing constraints; and
generate performance testing results based on a comparison of the plurality of testing environments in which the script package is executed according to the testing constraints.

20. A system comprising:
means for presenting to a user through a client device a graphical representation of an output of executing software;
means for capturing at least one image of the user interacting with the graphical representation of the output of the executing software;
means for applying computer vision to the at least one image to identify graphical elements in the graphical representation of the output of the executing software;
means for applying computer vision to the at least one image to identify user interactions with the graphical elements in the graphical representation of the output of the executing software based on the graphical elements identified in the graphical representation of the output of the executing software;
means for receiving user input indicating testing constraints for performance testing the software;
means for generating a script package based on the user interactions with the graphical elements in the graphical representation of the output of the executing software and the testing constraints;
means for forming one or more testing environments on one or more virtualized testbed machines according to the testing constraints;
means for performance testing the software in the one or more testing environments according to the testing constraints using the script package;
means for conducting performance testing analysis by applying computer vision to output generated by executing the script package a plurality of times in the one or more testing environments, the performance testing analysis detecting a frequency in which the graphical elements change and a degree to which the graphical elements change; and
means for generating performance testing results based on the detected frequency in which the graphical elements change and the degree to which the graphical elements change.

* * * * *